(12) United States Patent
Nakamura

(10) Patent No.: US 8,194,960 B2
(45) Date of Patent: Jun. 5, 2012

(54) METHOD AND APPARATUS FOR CORRECTING RESULTS OF REGION RECOGNITION, AND RECORDING MEDIUM HAVING A PROGRAM FOR CORRECTING RESULTS OF REGION RECOGNITION RECORDED THEREIN

(75) Inventor: Keigo Nakamura, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 761 days.

(21) Appl. No.: 12/100,948

(22) Filed: Apr. 10, 2008

(65) Prior Publication Data

US 2008/0267481 A1 Oct. 30, 2008

(30) Foreign Application Priority Data

Apr. 12, 2007 (JP) ................................. 2007-104846

(51) Int. Cl.
*G06K 9/00* (2006.01)
*G06K 9/48* (2006.01)
(52) U.S. Cl. ........................................ 382/131; 382/199
(58) Field of Classification Search .................. 382/131, 382/199
See application file for complete search history.

(56) References Cited

U.S. PATENT DOCUMENTS

| 5,553,207 | A | * | 9/1996 | Sekiguchi et al. | 345/424 |
|---|---|---|---|---|---|
| 5,817,019 | A | * | 10/1998 | Kawashima | 600/437 |
| 6,836,558 | B2 | * | 12/2004 | Doi et al. | 382/131 |
| 7,101,213 | B2 | | 9/2006 | Toyoda | |
| 7,120,229 | B2 | * | 10/2006 | Takasawa | 378/98.2 |
| 7,231,077 | B2 | * | 6/2007 | Eck et al. | 382/132 |
| 7,245,747 | B2 | | 7/2007 | Oosawa | |
| 2009/0175514 | A1 | * | 7/2009 | Zhao et al. | 382/128 |

FOREIGN PATENT DOCUMENTS

| JP | 9-187444 A | 7/1997 |
|---|---|---|
| JP | 2002-253539 A | 9/2002 |
| JP | 2005-108195 A | 4/2005 |
| JP | 2005224460 A * | 8/2005 |

OTHER PUBLICATIONS

DeJarnette et al., "CT Workflow in a PACS Environment", DeJarnette Research Systems Inc., online, Jan. 11, 2005; pp. 1-18 <URL:http://www.dejarnette.com/Tempfiles/%5CCT%20Workflow%20in%20a%20PACS%20Environment.pdf>.

* cited by examiner

*Primary Examiner* — Stephen R Koziol
*Assistant Examiner* — Utpal Shah
(74) *Attorney, Agent, or Firm* — Birch, Stewart, Kolasch & Birch, LLP

(57) ABSTRACT

To correct a region recognition result in each tomographic image easily. Causing a plurality of tomographic images representing a plurality of regions of a subject or a reconstructed image based on the images and results of recognition processing of the regions of the subject represented by the respective tomographic images, in which the positional relationship of the recognized regions between the tomographic images matches with the anatomical positional relationship of the regions, to be displayed on a screen, accepting input of correction information identifying a correction position which is a boundary of different regions, determining an image whose result of the recognition processing is incorrect and a correct region of the image based on the anatomical positional relationship and/or results of the recognition processing of images adjacent to the correction position, and the correction information, and correcting the result of the recognition processing of the image.

7 Claims, 20 Drawing Sheets

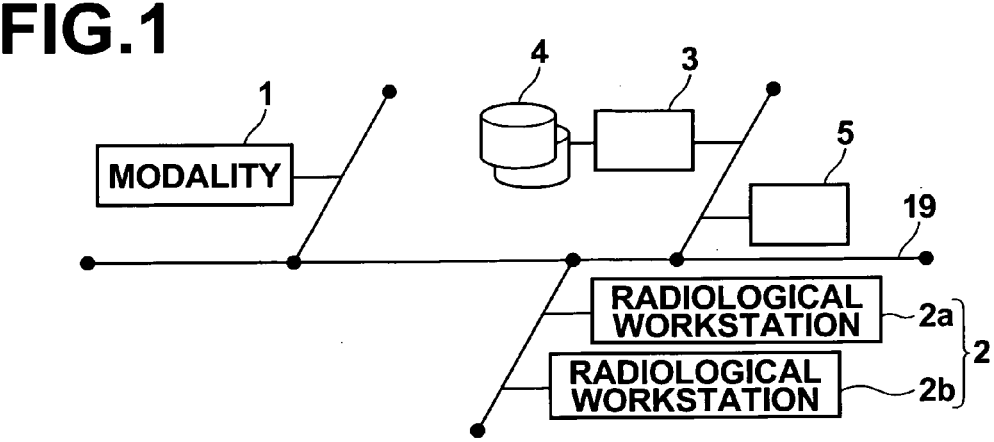
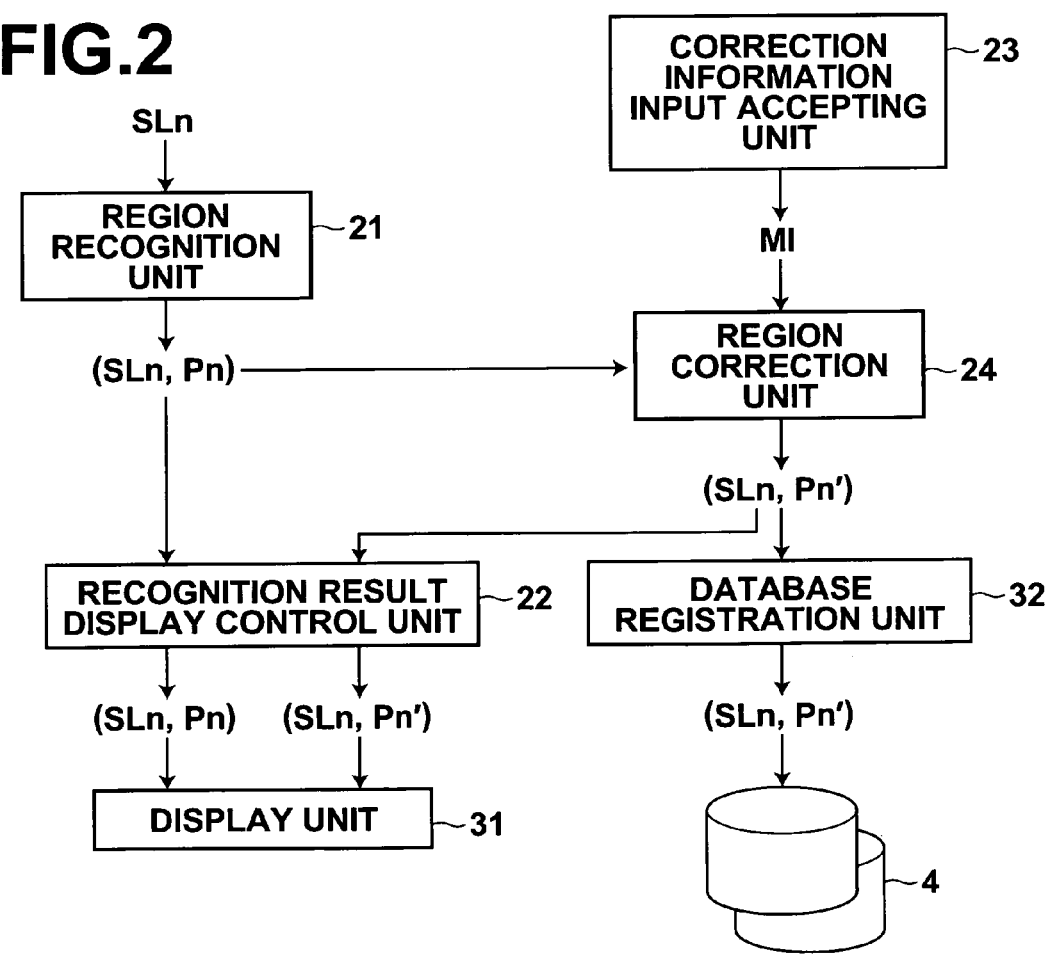

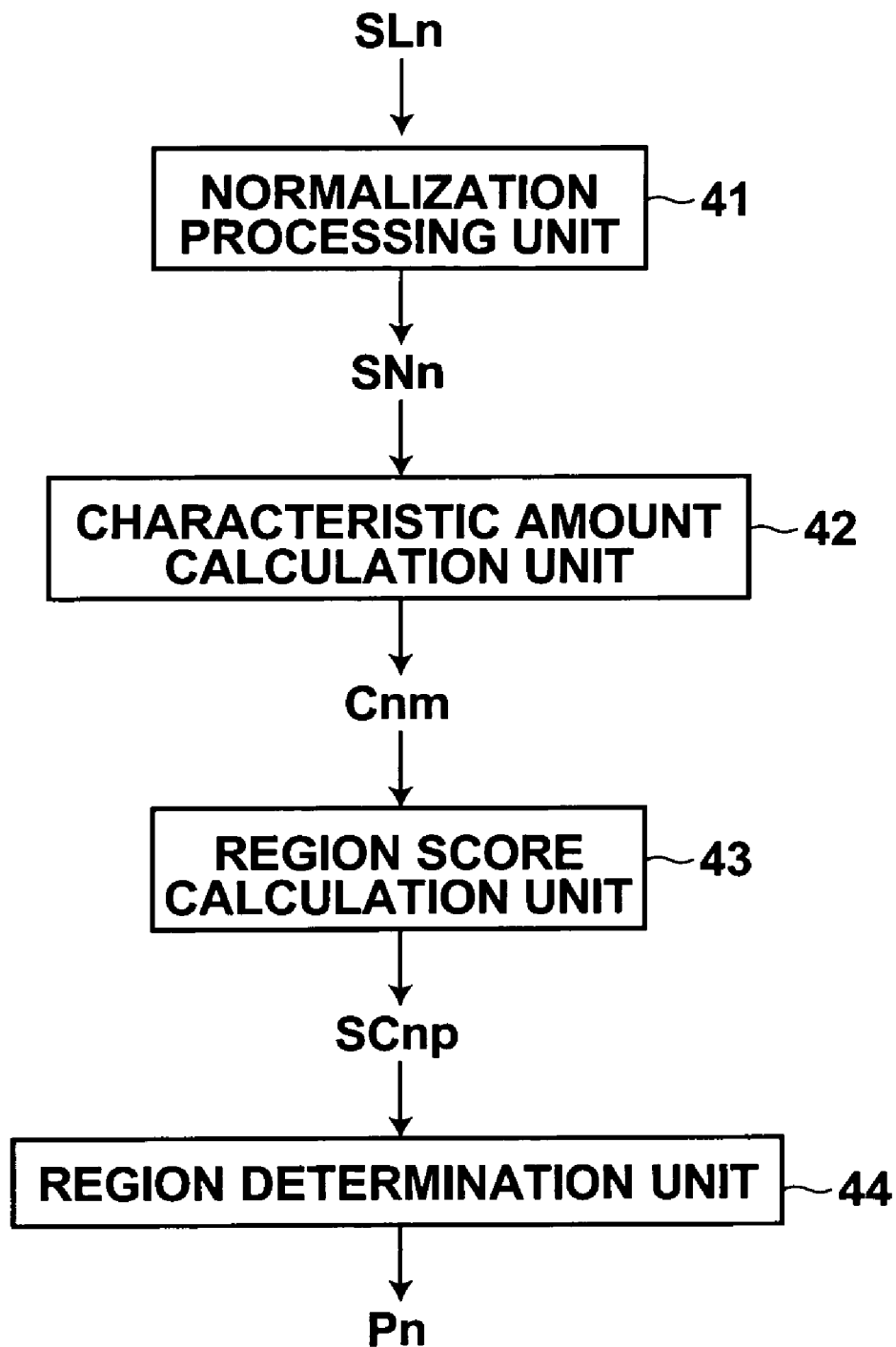

FIG.5A

|  | SLICE 1 | SLICE 2 | SLICE 3 | SLICE 4 | SLICE 5 | SLICE 6 | ... |
|---|---|---|---|---|---|---|---|
| HEAD | -0.3 | -0.2 | -0.5 | -0.7 | -0.9 | -0.7 | |
| HEAD-NECK | 2.0 | 1.2 | 0.1 | -0.5 | -0.8 | -0.5 | |
| NECK | -0.3 | -0.1 | 1.2 | 0.6 | 1.1 | 0.5 | |
| CHEST | -0.5 | -0.3 | -0.1 | 0.7 | 0.6 | 1.3 | |
| ...... | | | | | | | |

FIG.5B

|  | SLICE 1 | SLICE 2 | SLICE 3 | SLICE 4 | SLICE 5 | SLICE 6 | ... |
|---|---|---|---|---|---|---|---|
| HEAD | 2.3 | 1.4 | 1.7 | 2.1 | 2.0 | 2.0 | |
| HEAD-NECK | 0 | 0 | 1.1 | 1.9 | 1.9 | 1.8 | |
| NECK | 2.3 | 1.3 | 0 | 0.1 | 0 | 0.8 | |
| CHEST | 2.5 | 1.5 | 1.3 | 0 | 0.5 | 0 | |
| ...... | | | | | | | |

FIG.5C

|  | SLICE 1 | SLICE 2 | SLICE 3 | SLICE 4 | SLICE 5 | SLICE 6 | ... |
|---|---|---|---|---|---|---|---|
| HEAD | 2.3 | 1.4 | 1.7 | 2.1 | 2 | 2 | |
| HEAD-NECK | 0 | 0 | 0 | 1.1 | 1.9 | 1.9 | |
| NECK | 0 | 1.3 | 0 | 0.1 | 1.1 | 2.7 | |
| CHEST | 2.3 | 1.5 | 2.3 | 0 | 0.6 | 1.1 | |
| ...... | | | | | | | |

FIG.8A

| SLICE NUMBER | CORRECT REGION | REGION RECOGNITION RESULT |
|---|---|---|
| 1 | NECK | NECK |
| 2 | CHEST | CHEST |
| 3 | CHEST | CHEST |
| 4 | CHEST | CHEST |
| 5 | CHEST | CHEST |
| 6 | CHEST | CHEST |
| 7 | CHEST-ABDOMEN | CHEST |
| 8 | CHEST-ABDOMEN | CHEST |
| 9 | CHEST-ABDOMEN | CHEST |
| 10 | CHEST-ABDOMEN | CHEST-ABDOMEN |
| 11 | CHEST-ABDOMEN | CHEST-ABDOMEN |
| 12 | CHEST-ABDOMEN | CHEST-ABDOMEN |
| 13 | CHEST-ABDOMEN | CHEST-ABDOMEN |
| 14 | CHEST-ABDOMEN | CHEST-ABDOMEN |
| 15 | ABDOMEN | ABDOMEN |

(1) SPECIFIED POSITION
(2) FALSELY RECOGNIZED REGIONS
(3) CORRECT REGION
(4) CORRECT

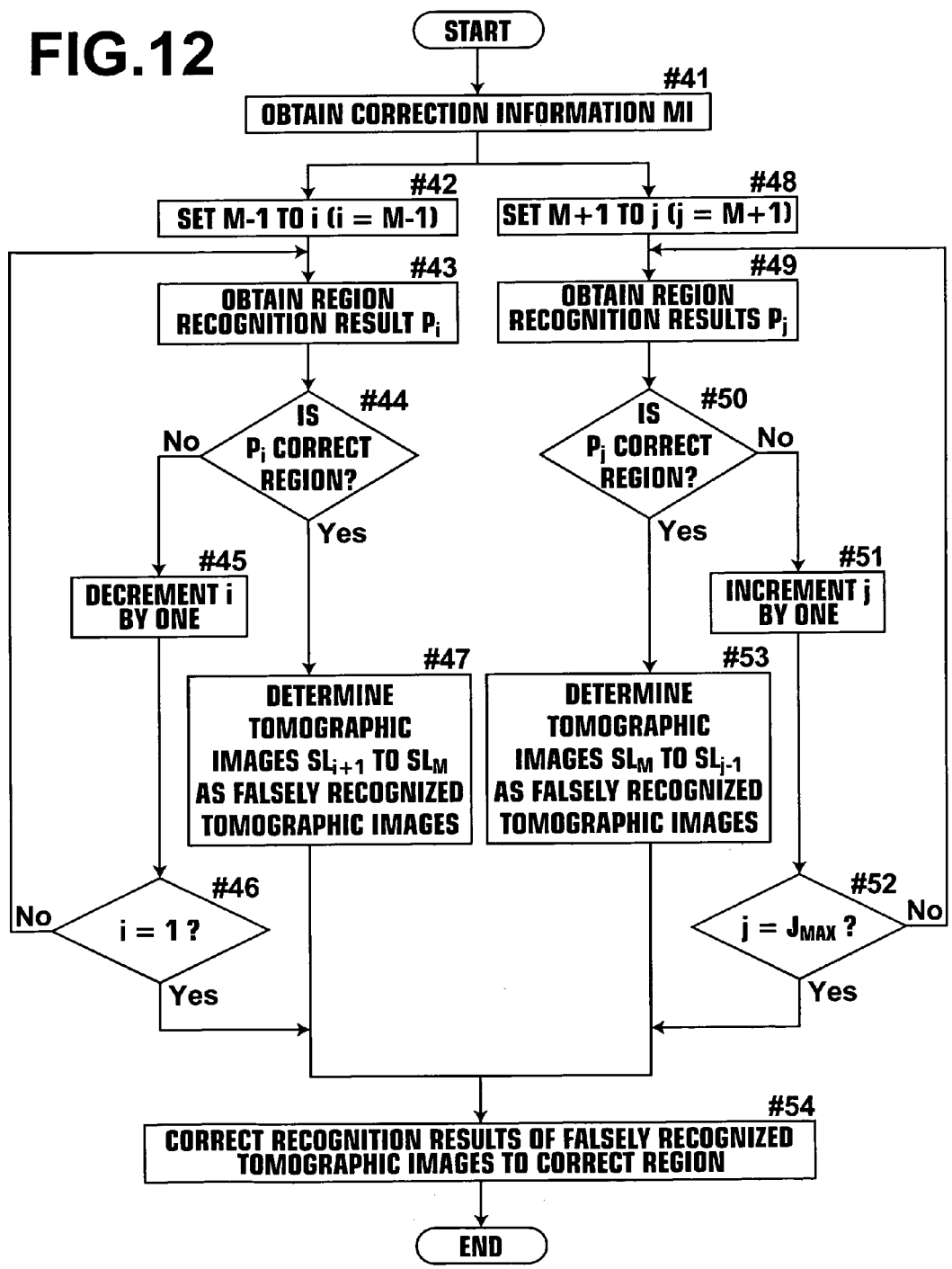

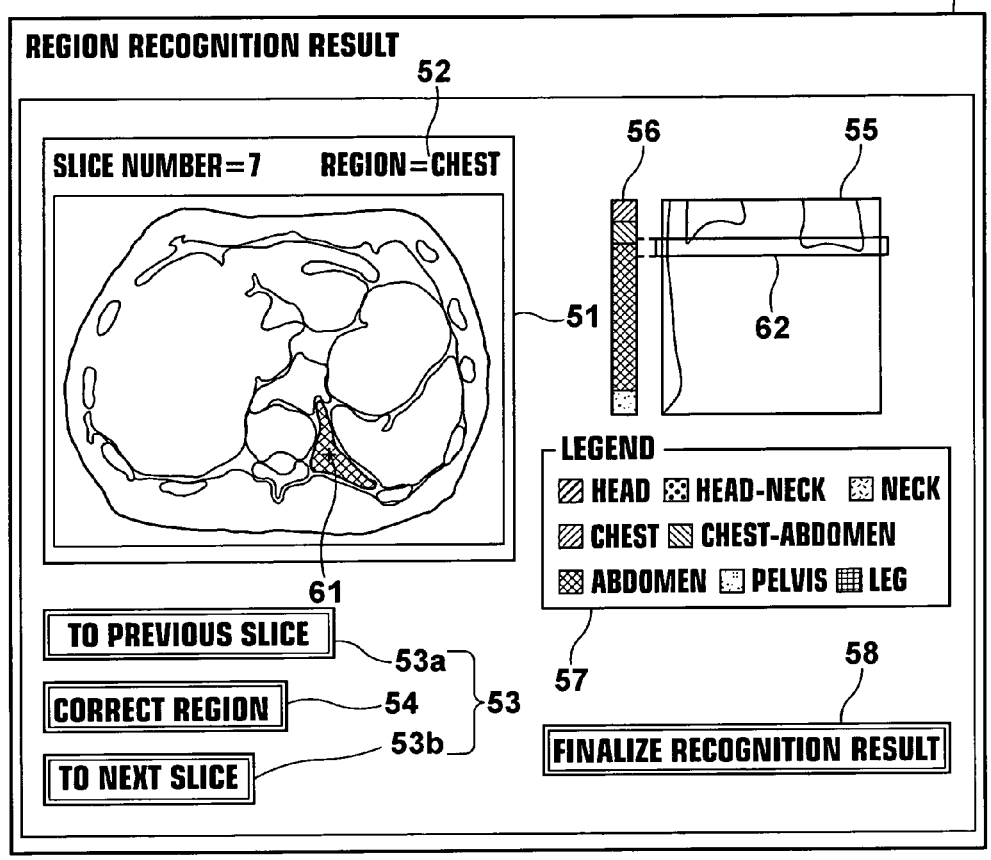

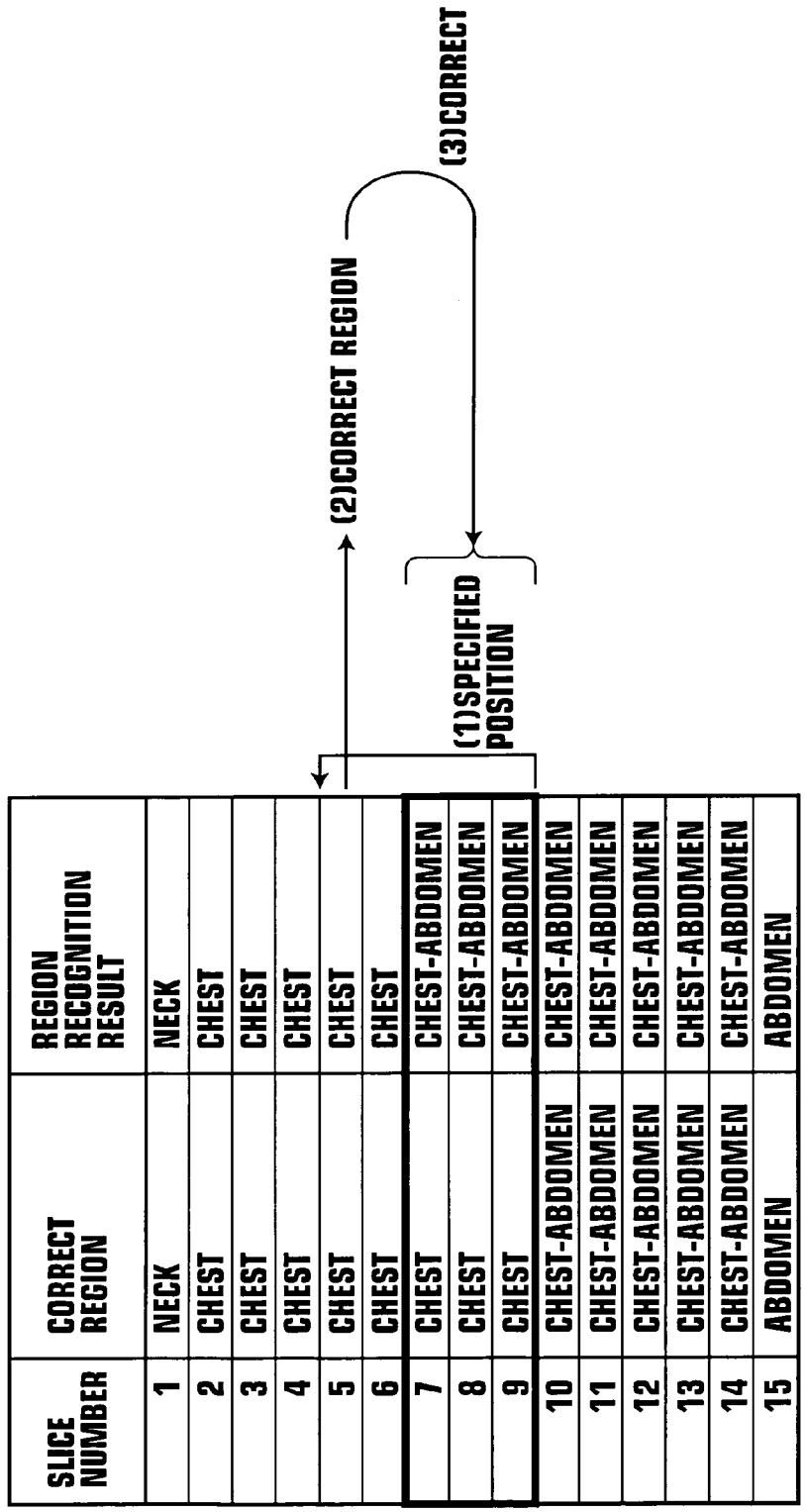

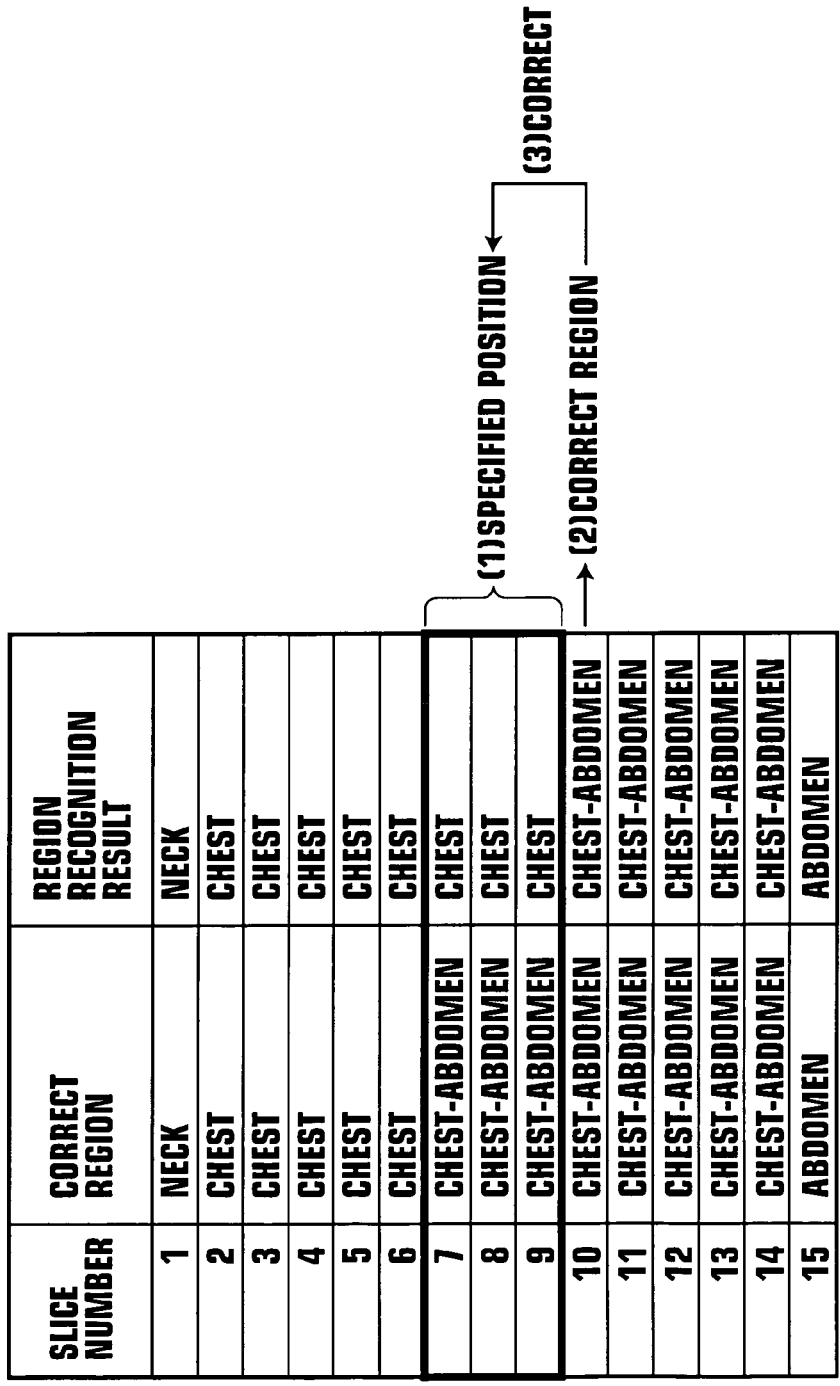

FIG.17B

| SLICE NUMBER | CORRECT REGION | REGION RECOGNITION RESULT |
|---|---|---|
| 1 | NECK | NECK |
| 2 | CHEST | CHEST |
| 3 | CHEST | CHEST |
| 4 | CHEST | CHEST |
| 5 | CHEST | CHEST |
| 6 | CHEST | CHEST |
| 7 | CHEST | CHEST-ABDOMEN |
| 8 | CHEST | CHEST-ABDOMEN |
| 9 | CHEST | CHEST-ABDOMEN |
| 10 | CHEST-ABDOMEN | CHEST-ABDOMEN |
| 11 | CHEST-ABDOMEN | CHEST-ABDOMEN |
| 12 | CHEST-ABDOMEN | CHEST-ABDOMEN |
| 13 | CHEST-ABDOMEN | CHEST-ABDOMEN |
| 14 | CHEST-ABDOMEN | CHEST-ABDOMEN |
| 15 | ABDOMEN | ABDOMEN |

(1) SPECIFIED POSITION
(2) CORRECT REGION
(3) CORRECT

METHOD AND APPARATUS FOR CORRECTING RESULTS OF REGION RECOGNITION, AND RECORDING MEDIUM HAVING A PROGRAM FOR CORRECTING RESULTS OF REGION RECOGNITION RECORDED THEREIN

BACKGROUND OF THE INVENTION

1. Field of the Invention

The present invention relates to an apparatus and method for correcting recognition results of imaged regions by image recognition processing performed on a plurality of medical tomographic images. The invention also relates to a computer readable recording medium having a program for causing a computer to perform the method.

2. Description of the Related Art

As the speed and performance, e.g., multi-slice capability of imaging modalities, such as CT, MRI and the like are improved, it has become possible to image a plurality of regions of a subject by one series of imaging and to obtain several hundreds to several thousands of tomographic images. This alleviates the burden felt by the subject because the subject does not have to have imaged several times with respect to each region and also the overall imaging time is reduced. On the other hand, radiological readers, such as image diagnosticians, who perform radiological reading on the obtained images, it is often the case that different doctors perform radiological reading and diagnosis on different target regions. Consequently, the radiological reader of each region must search for and find only those necessary for reading from multitudes of images including a plurality of regions, and perform radiological reading and diagnosis, which increases the time and effort required of them.

Consequently, a system which is expected to help alleviate the burden on both sides is proposed as described, for example, in "CT Workflow in a PACS Environment" by Wayne DeJarnette, et al., [online], Jan. 7, 2005, Dejanette Research Systems Inc., [retrieved date, Mar. 27, 2007], Internet <URL:http://www.dejarnette.com/TempFiles/%5CCT%20Workflow%20in% 20a%20PACS%20Environment.pdf>. In the system, individual imaging orders (work lists) for a plurality of regions are consolidated, and a plurality of tomographic images including a plurality of regions is obtained by an imaging modality (multi-slice CT equipment) through one series of imaging according to the consolidated work list. Thereafter, a predetermined image analysis is performed on each of the plurality of tomographic images to recognize a region represented by each image, then the plurality of images is divided in the order of imaging according to the recognized regions, and the plurality of tomographic images is stored in an image database (PACS Archive) with respect to each region.

As for the method of recognizing a region represented by each tomographic image, a template matching method as described, for example, in Japanese Unexamined Patent Publication No. 2002-253539, a method using a characteristic image of each region as described, for example, in Japanese Unexamined Patent Publication No. 2003-10166, or the like is known.

Results of the image analyses described above, however, may sometimes include recognition errors, so that radiologists, image diagnosticians, or the like have to check each tomographic image and the region recognition result thereof and correct errors one by one, which is a great burden on them.

The present invention has been developed in view of the circumstances described above, and it is an object of the present invention to provide an apparatus and method capable of correcting results of region recognition in each tomographic image more easily. It is another object of the present invention to provide a computer readable recording medium having a program for correcting results of region recognition recorded therein.

SUMMARY OF THE INVENTION

The region recognition result correction apparatus of the present invention is an apparatus including:

a recognition result display control means that causes the following to be displayed on a screen: a plurality of tomographic images representing a plurality of regions of a subject or a reconstructed image based on the plurality of tomographic images; and results of recognition processing of the regions of the subject represented by the respective tomographic images, wherein the positional relationship of the regions recognized in the respective tomographic images between the tomographic images matches with the anatomical positional relationship of the plurality of regions of the subject;

a correction information input accepting means that accepts input of correction information capable of identifying a correction position which is supposed to be a boundary of different regions and used for correcting a result of the recognition processing; and a region correction means that determines an incorrectly recognized tomographic image whose result of the recognition processing is incorrect and a correct recognition result representing a correct region of the incorrectly recognized tomographic image based on at least either one of the anatomical positional relationship or results of the recognition processing of tomographic images adjacent to the correction position, and the correction information, and corrects the result of the recognition processing of the incorrectly recognized tomographic image to the correct recognition result.

The region recognition result correction method of the present invention is a method including the steps of:

causing the following to be displayed on a screen: a plurality of tomographic images representing a plurality of regions of a subject or a reconstructed image based on the plurality of tomographic images; and results of recognition processing of the regions of the subject represented by the respective tomographic images, wherein the positional relationship of the regions recognized in the respective tomographic images between the tomographic images matches with the anatomical positional relationship of the plurality of regions of the subject;

accepting input of correction information capable of identifying a correction position which is supposed to be a boundary of different regions and used for correcting a result of the recognition processing;

determining an incorrectly recognized tomographic image whose result of the recognition processing is incorrect and a correct recognition result representing a correct region of the incorrectly recognized tomographic image based on at least either one of the anatomical positional relationship or results of the recognition processing of tomographic images adjacent to the correction position, and the correction information, and correcting the result of the recognition processing of the incorrectly recognized tomographic image to the correct recognition result.

The computer readable recording medium having a region recognition result correction program recorded therein is a medium having a program for causing a computer to perform the method described above.

Hereinafter, details of the present invention will be described.

As a specific example of the "subject", a human body may be cited, but it may be animals or the like.

If the subject is a human body, the term "region" means a portion of the body. Specific examples include head, neck, chest, abdomen, pelvis, leg, and a composite region including two adjacent ones thereof, such as head-neck, chest-abdomen, or the like.

For an image obtained by CT or MRI, axial section images representing sections perpendicular to the body axis are generally used as the "tomographic images".

As a specific example of the "reconstructed image based on the plurality of tomographic images", an image viewed from a direction different from the tomographic images, for example, a coronal section, or a sagittal section, reconstructed by performing known MPR (Multi-Planar Reconstruction) processing on a plurality of tomographic images may be cited.

The "results of recognition processing of the regions of the subject represented by the respective tomographic images" are on the assumption that "the positional relationship of the regions recognized in the respective tomographic images between the tomographic images matches with the anatomical positional relationship of the plurality of regions of the subject". As for the recognition processing, processing that provisionally recognizes a region of the subject represented by each of the plurality of tomographic images based on a characteristic of content thereof, and determines the region of the subject represented by each of the tomographic images based on results of the provisional recognition of one or more tomographic images at least on either side preceding or following each tomographic image and the anatomical positional relationship of the respective regions of the subject such that the anatomical positional relationship is maintained between the one or more tomographic images is conceivable. Here, as specific examples of "characteristic of content", a statistical amount, such as pixel values or an average of pixel values within a small area set in a tomographic image, a ratio of an air region or a bone region in a body portion, shape of a body portion, and the like may be cited. As for the "provisional recognition processing", a method using discriminators obtained through machine learning with AdaBoost, Support Vector Machine (SVM), Relevance Vector Machine (RVM), Artificial Neural Network (ANN), or the like, a template matching described in Patent Document 1, a comparative processing with a unique image described in Patent Document 2, or the like may be cited. The term "anatomical positional relationship" as used herein means an arrangement order of body portions from top to downward, for example, in the case of a human body, the arrangement order of head, neck, chest, abdomen, pelvis, and leg. As a specific example of the "processing of determining regions represented by respective regions of the subject such that the anatomical positional relationship is maintained", a method using dynamic programming may be cited. As a specific example of the method of correcting "the result of the recognition processing of the incorrectly recognized tomographic image to the correct recognition result", a method of detecting a boundary position of different regions obtained by the recognition processing on both sides of the correction position based on inputted results of the recognition processing of tomographic images adjacent to the correction position, determining a tomographic image lying between one of detected boundary positions located closer to the correction position and the correction position as the incorrectly recognized tomographic image, and performing the correction with a result of the recognition processing of one of the tomographic images adjoining to the boundary position located closer to the correction position which is not an incorrectly recognized tomographic image as the correct recognition result. In this case, the boundary position itself or at least either one of the tomographic images adjoining to the boundary may be specified as input of the correction position. In the latter case, an arrangement may be adopted in which additional information specifying where the boundary is located, before or after the tomographic image, is inputted or a predetermined side, before or after the tomographic image, is determined as the boundary. Otherwise, one of the tomographic images adjoining to the boundary whose result of the recognition processing is incorrect may be specified. In this case, the correction may be performed including the specified tomographic image in the incorrectly recognized images. Contrary, one of the tomographic images adjoining to the boundary whose result of the recognition processing is correct may be specified. In this case, the correction maybe performed without including the specified tomographic image in the incorrectly recognized images.

Further, an arrangement may be adopted in which input of correction information including one of the tomographic images adjoining to the correction position whose result of the recognition processing is incorrect and a correct region thereof are accepted, a correct tomographic image with a region obtained by the recognition processing corresponding to the inputted correct region is detected from tomographic images adjacent to the inputted tomographic image, a tomographic image lying between the correct tomographic image and the inputted tomographic image whose result of the recognition processing is incorrect, and the inputted tomographic image are determined as incorrectly recognized images, and the correction is performed with the inputted correct region as the correct recognition result. In this case, the boundary between the inputted tomographic image and the tomographic image adjoining on the opposite side becomes the correction position which is supposed to be a boundary of different regions, so that the inputted correction information can be an example of the information capable of identifying the correction position.

Further, an arrangement may be adopted in which the identical information to that described above is accepted, and a tomographic image of those adjacent to the inputted tomographic image representing a region obtained by the recognition processing whose positional relationship with the inputted correct region does not match with the anatomical positional relationship of the subject is determined as an incorrectly recognized tomographic image, and the correction is performed with the inputted correct region as the correct recognition result. In this method, the boundary between one of the two tomographic images adjoining to the inputted tomographic image having a region obtained by the recognition processing whose positional relationship with a correct region of the inputted tomographic image matches with the anatomical positional relationship of the subject can be so that the inputted correction information becomes the correction position which is supposed to be a boundary of different regions, so that the inputted correction information can be an example of the information capable of identifying the correction position.

Further, an arrangement may be adopted in which input of correction information representing a range including a plurality of tomographic images from the correction position through a tomographic image whose result of the recognition processing is incorrect to a tomographic image whose result of the recognition processing is correct specified according to a predetermined order is accepted, the tomographic image whose result of the recognition processing is correct is identified based on the predetermined order, and the correction is performed with a region recognized in the tomographic image whose result of the recognition processing is correct as the correct recognition result and the tomographic image whose result of the recognition processing differs from the correct recognition result within the inputted range as the incorrectly recognized tomographic image. In this case, the boundary between the tomographic image whose result of the recognition processing is incorrect located farthest from the tomographic image whose result of the recognition processing is correct and the tomographic image adjoining to the tomographic image whose result of the recognition processing is incorrect located outside of the range becomes the correction position which is supposed to be a boundary of different regions, so that the inputted correction information can be an example of the information capable of identifying the correction position.

Still further, an arrangement may be adopted in which input specifying all of the tomographic images whose results of the recognition processing are incorrect is accepted, and the recognition results of the incorrectly recognized tomographic images are corrected with one of the two tomographic images adjoining to both sides of the specified plurality of incorrectly recognized tomographic images whose recognition result is different from that of the incorrectly recognized tomographic images as the correct recognition result. In this case, the boundary between one of the two tomographic images adjoining to the specified incorrectly recognized tomographic images whose result of the correction processing corresponds to the results of the incorrectly recognized tomographic images and the incorrectly recognized tomographic image adjoining to the tomographic image becomes the correction position which is supposed to be a boundary of different regions, so that the inputted correction information can be an example of the information capable of identifying the correction position.

Still further, an arrangement may be adopted in which, when a length of at least either one of a pre-correction region or a post-correction region in a corrected tomographic image in the direction perpendicular to the tomographic plane of the tomographic image does not satisfies a predetermined standard, a region of at least some of the plurality of tomographic images is re-corrected to satisfy the predetermined standard. Here, a specific example of a predetermined standard, a standard defining whether or not the length of the region of the subject is within an anatomically possible length range, and an anatomically possible length range of each region may be set in a reference table or as a function in advance.

According to the present invention, with respect to results of recognition of regions of a subject represented by a plurality of tomographic images recognized such that the positional relationship thereof between the tomographic images matches with the anatomical positional relationship of the plurality of regions of the subject, by simply inputting correction information capable of identifying a correction position which is supposed to be a boundary of different regions, an incorrectly recognized tomographic image whose recognition result is incorrect and a correct recognition result representing a correct region of the incorrectly recognized tomographic image are determined based on at least either one of the anatomical positional relationship or results of the recognition processing of tomographic images adjacent to the correction position, and the correction information, and the recognition result of the incorrectly recognized tomographic image is corrected to the correct recognition result. This eliminates the need for making corrections individually on tomographic images including incorrect recognition results, that is, the correction of region recognition results can be made by a simple and easy input operation, so that the burden of radiologists and image diagnosticians who perform corrections on region recognition results may be alleviated in terms of time and effort.

BRIEF DESCRIPTION OF THE DRAWINGS

FIG. 1 is a schematic configuration diagram of a medical information system employing a region recognition result correction apparatus according to an embodiment of the present invention.

FIG. 2 is a block diagram illustrating a region recognition result correction apparatus according to any of first to third embodiments of the present invention, illustrating the configuration thereof including periphery.

FIG. 3 is a block diagram of a region recognition unit, schematically illustrating the configuration thereof.

FIG. 5A illustrates scores with respect to each slice and region (region score) used in region recognition processing.

FIG. 5B illustrates scores with respect to each slice and region (weight map) used in region recognition processing.

FIG. 5C illustrates scores with respect to each slice and region (cost map) used in region recognition processing.

FIG. 8A illustrates an example of region recognition result correction processing in the first embodiment of the present invention.

FIG. 12 is a flowchart illustrating a flow of the region recognition result correction processing in the second embodiment of the present invention.

FIG. 14 illustrates an example of region recognition result screen in the third embodiment of the present invention.

FIG. 16B illustrates an example of region recognition result correction processing in the third embodiment of the present invention.

FIG. 17A illustrates an example of region recognition result correction processing in a modification of the third embodiment of the present invention.

FIG. 17B illustrates another example of region recognition result correction processing in a modification of the third embodiment of the present invention.

BRIEF DESCRIPTION OF THE DRAWINGS

Figure 4A:
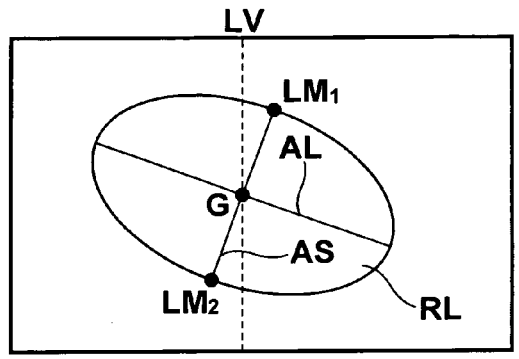
FIG. 4A is a drawing schematically illustrating a landmark setting method for normalizing a tomographic image (labeling number =1, for horizontally elongated human body region).

Hereinafter, exemplary embodiments of the present invention will be described with reference to the accompanying drawings. FIG. 1 schematically illustrates a configuration of a medical information system employing a region recognition result correction apparatus according to an embodiment of the present invention. As illustrated, the system includes a medical image imaging apparatus (modality) 1, a radiological workstation 2 (2a, 2b), an image information management server 3, an image information database 4, and a region recognition result correction terminal 5, which are communicatably connected to each other through a network 19. Each of these excluding databases is controlled by a program installed from a recording medium, such as a CD-ROM. Alternatively, the program may be a program which is downloaded from a server connected a network, such as the Internet, and installed. The modality 1 includes a device that images an examination target region of a subject to generate image data of an image representing the region, and outputs the image data with accessory information defined by DICOM standard attached thereto as image information. The accessory information may be generated according to own standard of a manufacturer of the modality or the like. Specific examples of the modality include CT (Computed Tomography), MRI (Magnetic Resonance Imaging), PET (Positron Emission Tomography), an ultrasound imaging apparatus, and the like. It is noted that a pair of image data representing a subject and accessory information of the image data will be, hereinafter, referred to as "image information". That is, the "image information" includes text information related to the image.

The radiological workstation 2 is used by an image diagnostician that performs radiological reading and provides a radiological report, and includes a processing device, one or two high-resolution displays, and an input device of keyboard/mouse, or the like. In the workstation, the following are performed: an access request for image to the image information management server 3, various types of image processing on an image received from the image information management server 3, display of the image, automatic detection and highlighting of a portion of the image appearing to be a lesion, support of radiological report generation, a registration request for the radiological report or an access request for report to a radiological report server (not shown), display of the radiological report received from the radiological report server, and the like. It is noted that an arrangement may be adopted in which an additional image processing server is connected to the network 19, and the image quality/visibility improvement processing and image analysis processing, such as various types of image processing, automatic detection and highlighting of a lesion candidate, and the like are performed by the image processing server according to respective processing requests from the radiological workstation 2, instead of performing them in the radiological workstation 2.

The image information management server 3 is a relatively powerful general purpose computer having a software program installed therein that provides a data base management system (DBMS) function. In the present embodiment, the computer further includes a software program that provides a region recognition function for recognizing an imaged region of a subject represented by a tomographic image transmitted from the modality 1 and a region recognition result correction function for correcting the recognized imaged region (to be described in detail later). The image information management server 3 also includes a large capacity storage constituting the image information database 4. The storage may be a large capacity hard disk connected to the image information management server 3 by a data bus or a disk device connected to a NAS (Network Attached Storage) or a SAN (Storage Area Network) connected to the network 19.

When a registration request for image information is received from the modality 1, the image information management server 3 arranges the image information into a database format and registers the arranged image information on the image information database 4.

In the image information database 4, image data representing a subject image and accessory information are registered. The accessory information may include, for example, an image ID for identifying an individual image, a patient ID for identifying a subject, a unique ID (UID) allocated to each image information, inspection date and time when the information is generated, type of modality used for obtaining the image information, patient information including the name, age, gender, and the like, inspected region (imaged region), imaging information (imaging protocol, imaging sequence, imaging method, imaging condition, use of contrast agent, and the like), serial number or acquisition number when a plurality of images is obtained by a single inspection. The image information can be managed, for example, as XML data or SGML data.

When an access request for image information is received from the radiological workstation 2 via the network 19, the image information management server 3 searches the image information database 4 for the requested image information, and transmits the extracted image information to the requesting radiological workstation 2.

When an operation for making access request for a target image of radiological reading is performed by a user, such as an image diagnostician, the radiological workstation 2 transmits the access request to the image information management server 3 to obtain the image information required for the radiological reading. Then, the workstation displays the obtained image information on the monitor screen, and performs automatic detection of a lesion and the like in response to a request from the image diagnostician.

The region recognition result correction terminal 5 is an apparatus for correcting a recognition result of an imaged region of each of a plurality of tomographic images of a subject including a plurality of regions, obtained by the modality 1, such as CT or MRI, before or after they are registered in the image information database 4. It is a computer, such as a personal computer or a workstation having a processing device, one or two high-resolution displays, and an input device of keyboard/mouse. The processing detail will be described later.

The network 19 is a local area network connecting various types of apparatuses and devices in a hospital. In the case where the radiological workstation 2 is installed also in another hospital or clinic, the network 19 may be configured by a local area network of each hospital and the Internet or a dedicated line connecting the local area networks. In any case, it is desirable that the network 19 is a high-speed transmission network for transmission of image information, such as an optical network.

Hereinafter, a region recognition function and a region recognition result correction function of a region recognition result correction apparatus according to a first embodiment of the present invention, and peripheral functions thereof will be described in detail. FIG. 2 is a block diagram schematically illustrating a configuration and a data flow for realizing these functions. As illustrated, the apparatus includes a region recognition unit 21, a recognition result display control unit 22, a correction information input accepting unit 23, a region correction unit 24, a display unit 31, and a database registration unit 32. The region recognition unit 21 recognizes a region $P_n$ of a body represented by each of inputted tomographic images $SL_n$ (n=1, 2, - - - ), and the recognition result display control unit 22 causes the display unit 31 to display the inputted tomographic images and a recognition result ($SL_n$, $P_n$) of each image. The correction information input accepting unit 23 accepts information M for correcting the recognition result, and the region correction unit 24 performs correction on the recognition result based on the correction information MI. The recognition result display control unit 22 causes the display unit 31 to display corrected recognition result ($SL_n$, $P_n'$). When the correction is completed, the database registration unit 32 registers the inputted tomographic images and final recognition results of the respective images ($SL_n$, $P_n'$) in the image information database 4. Each processing unit will now be described in detail.

The region recognition unit 21 a processing unit implemented in the image information management server 3. It performs region recognition processing on a plurality of inputted tomographic images representing a plurality of regions of a subject of human body, obtained by CT, determines a region represented by each tomographic image, and outputs information corresponding to the determined region (e.g., text of region name or code identifying each region) by attaching the information to the corresponding tomographic image as accessory information based on DICOM standard. The region recognition processing determines a region represented by each tomographic image such that the arrangement order of head, head-neck, neck, chest, chest-abdomen, abdomen, pelvis, and leg is maintained when the tomographic images are arranged in the order of human body portions from top to bottom.

FIG. 3 is a block diagram illustrating the processing of the region recognition unit 21 in detail. As illustrated, the region recognition unit 21 includes a normalization processing unit 41 for normalizing inputted tomographic images $SL_n$ (n=1, 2, - - - ), a characteristic amount calculation unit 42 for calculating many characteristic amounts $c_{nm}$ (m=1, 2, - - - ) from the normalized tomographic images $SN_n$, a region score calculation unit 43 for calculating region scores $sc_{np}$ (p=head, head-neck, neck, chest, chest-abdomen, abdomen, pelvis, and leg) that represents region likelihoods of each region by inputting characteristic amounts $c_{nm}$ calculated with respect to each normalized tomographic image $SN_n$ to a discriminator obtained by AdaBoost method, and a region determination unit 44 for determining a region $P_n$ represented by each inputted tomographic image $SL_n$ by dynamic programming method with the calculated region scores $sc_{nm}$ as input such that the body arrangement described above is maintained.

The normalization unit 41 extracts a human body region from each input image $SL_n$, calculates a landmark (reference point) from information of the extracted human body region, and generates a normalized image $SN_n$ by performing scaling, translation, or rotation through Affine transform with reference to the calculated landmark. The purpose of the normalization is to eliminate variations in the size and inclination of human body region in the inputted tomographic images $SL_n$ arising from individual variability, imaging condition, and the like, and aligning the positions of regions (e.g., bone region or air region) in the human body region, thereby improving efficiency and accuracy of the region recognition processing that follows.

Here, the method for extracting the human body region from input images $SL_n$ may be any known method at the time when the present invention is practiced. For example, a method as described, for example, in Japanese Unexamined Patent Publication No. 9 (1997)-187444) or the like maybe used. The method extracts candidate contours of a human body region from each input image $SL_n$ after performing binarization processing and noise removing processing, then removes a contour having an inner area smaller than a predetermined threshold value, and determines the inside of the remaining contour as the human body region.

Figure 4B:
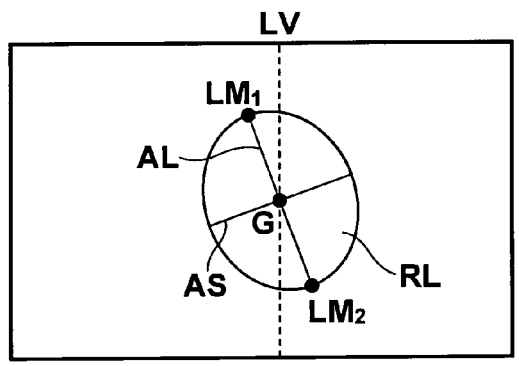
FIG. 4B is a drawing schematically illustrating a landmark setting method for normalizing a tomographic image (labeling number =1, for vertically elongated human body region).
Figure 4C:
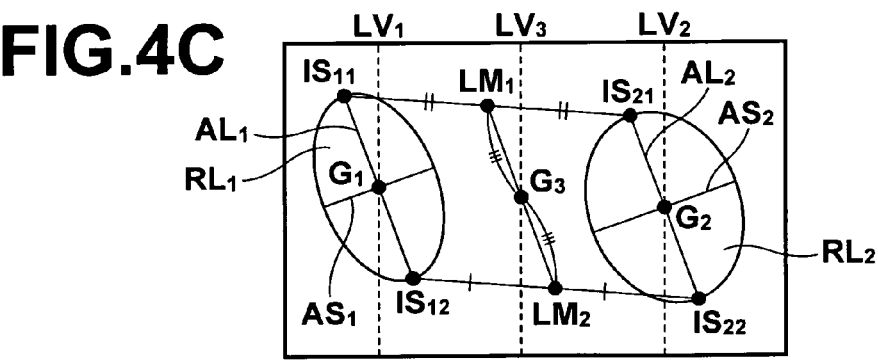
FIG. 4C is a drawing schematically illustrating a landmark setting method for normalizing a tomographic image (labeling number =2).
Figure 4D:
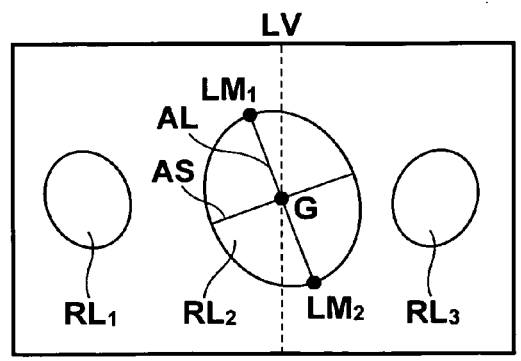
FIG. 4D is a drawing schematically illustrating a landmark setting method for normalizing a tomographic image (labeling number =3).

Further, landmarks may be two points which are the intersecting points of a contour line and a median plane. More specifically, landmarks may be obtained according to the labeling number obtained by performing labeling processing on the extracted human body region as illustrated in FIGS. 4A to 4D. If the labeling number is 1 as is in FIGS. 4A and 4B, the gravity point G of the labeling area (human body region) RL is obtained, and a long axis AL and a short axis AS passing the gravity point G, as well as a straight line LV passing the gravity point and extending in the vertical direction of the tomographic image $SL_n$ are set. Then, intersecting points of one of the long axis AL and short axis AS, forming a smaller angle with the straight line LV, and the contour of the human body region RL are determined as landmarks $LM_1$ and $LM_2$. FIG. 4A schematically illustrates the case where the angle formed between the short axis AS and straight line LV is smaller than the angle formed between the long axis AL and straight line LV which corresponds to an image representing the chest, chest-abdomen, abdomen, and pelvis. FIG. 4B schematically illustrates the case where the angle formed between the long axis AL and straight line LV is smaller than the angle formed between the short axis AL and straight line LV which corresponds to an image representing the head, head-neck, and neck. FIG. 4C illustrates the case where the labeling number is two which corresponds to an image representing the leg. In this case, gravity points $G_1$ and $G_2$ are obtained with respect to the labeling areas $RL_1$ and $RL_2$ respectively, and long axes $AL_1$, $AL_2$, short axes $AS_1$, $AS_2$ passing the gravity points $G_1$ and $G_2$ respectively and straight lines $LV_1$, $LV_2$ passing the gravity points $G_1$ and $G_2$ respectively and extending in the vertical direction of the tomographic image $SL_n$ are set. Then, intersecting points of one of the long axis $AL_1$ and short axis $AS_1$, forming a smaller angle with the straight line $LV_1$, are designated as $IS_{11}$ and $IS_{12}$. Likewise, intersecting points of one of the long axis $AL_2$ and short axis $AS_2$, forming a smaller angle with the straight line $LV_2$, are designated as $IS_{21}$ and $IS_{22}$. Then, midpoints of line segments $IS_{11}$ to $IS_{21}$ and $IS_{12}$ to $IS_{22}$ which do not cross to each other are set as landmarks $LM_1$, $LM_2$. If the area ratio of the two labeling areas is not within a predetermined range, that is, the difference in area between the two labeling areas is greater than a predetermined threshold value, the smaller labeling area is determined to be a medical appliance or the like, and processing identical to that of the case when the labeling number is one is performed. FIG. 4D is a case where the labeling number is three which corresponds to an image representing neck and both arms. In this case, processing identical to that where the labeling number is one is performed on one of the labeling regions $RL_1$, $RL_2$, and $RL_3$ having a largest area ($RL_2$) to obtain landmarks $LM_1$ and $LM_2$. In FIGS. 4A, 4B, and 4D, if the distance from the straight line LV to each of the landmarks $LM_1$ and $LM_2$ are greater than a predetermined threshold value, correction processing may be performed such that the positions of the landmarks $LM_1$ and $LM_2$ are moved closer to the straight line LV along the contour of the area RL. Likewise, in FIG. 4C, if the distance from the straight line $LV_3$ passing the midpoint $G_3$ of the line segments $IS_{11}IS_{21}$ and $IS_{12}IS_{22}$ and extending the vertical direction of the tomographic image $SL_n$ to each of the landmarks $LM_1$ and $LM_2$ is greater than a predetermined threshold value, correction processing may be performed such that the positions of the landmarks $LM_1$ and $LM_2$ are moved closer to the straight line $LV_3$ along the line segments $IS_{11}IS_{21}$ and $IS_{12}IS_{22}$. A specific example of moving amount is that the landmarks $LM_1$ and $LM_2$ are moved such that the distance from the straight line LV or $LV_3$ to each of the landmarks $LM_1$ and $LM_2$ are reduced by 20%.

With reference to the landmarks $LM_1$ and $LM_2$ obtained in the manner as described above, each of the tomographic images $SL_n$ are normalized, through Affine transform or the like, such that the landmarks $LM_1$ and $LM_2$ are located in the center of the image in the horizontal direction with the distance between them becomes a predetermined value.

The characteristic amount calculation unit 42 calculates many characteristic amounts $c_{nm}$ from each of the normalized images $SN_n$. Specific examples of the characteristic amounts $c_{nm}$ include pixel values, average of the pixel values, maximum value, minimum value, median value in a block (e.g., 3×3 pixels or the like) set within a normalized image $SN_n$, ratio of an air region or a bone region in a human body region extracted by threshold processing to the human body region, the area ratio of the human body region to the area of a circle having the same perimeter length as the human body region (degree of circularity), and the like. It is noted that the characteristic amounts $c_{nm}$ may be calculated amounts themselves or multinarized values thereof.

The region score calculation unit 43 calculates each of the region scores $sc_{np}$ representing region likelihood with respect to each of the tomographic image $SL_n$ by inputting the characteristic amounts $c_{nm}$ to a group of discriminators of each region obtained by training based on AdaBoost method. Here, the group of discriminators for each region is obtained through training using many types of characteristic amounts calculated from each of training samples including a plurality of images known to representing the region and a plurality of images known not to representing the region. The group of discriminators of one region includes one or more discriminators. If it includes two or more discriminators, they have a complementary relationship with respect to discrimination performance. The same numbers of discriminator groups as the types of regions to be discriminated are generated, and the type of characteristic amount is determined with respect to each discriminator group. For details of the training and region score calculation method, reference is directed to Japanese Unexamined Patent Publication No. 2005-108195. The region score calculation method may be a method using discriminators generated by a different training method, such as artificial neural network (ANN), support vector machine (SVM), relevance vector machine (RVM), a method that determines a region score based on one characteristic amount or a combination of a plurality of characteristic amounts using a reference table, or the like other than the method described above. The processing of the characteristic amount calculation unit 42 and the processing of the region score calculation unit 43 maybe replaced with the processing described in Patent Document 1 or Patent Document 2 in which a degree of similarity obtained by template matching (Patent Document 1) or comparison with the characteristic image (Patent Document 2) is determined as the region score.

Through the processing described above, each of the scores $sc_{np}$ for each region is determined with respect each of the tomographic images $SL_n$. FIG. 5A is a table illustrating an example of scores $sc_{np}$ calculated for the respective regions of respective tomographic images (slices) $SL_n$, which indicate that the higher the value of the region score the higher the probability of the slice to representing the region. In the table, tracing of a region having a maximum region score with respect to each of the slices $SL_n$ results in the following: slice 1—head, slice 2—head-neck, slice 3—neck, slice 4—chest, slice 5—neck, slice 6—chest, mismatching with the arrangement order of human body portions. Consequently, a correction is made by the processing of the region determination unit 44 that follows.

The region determination unit 44 performs processing to make a final decision on each of the regions $P_n$ represented by each of the tomographic images $SL_n$ such that mismatching does not occur between the arrangement order of human body portions, that is, reference regions of human body arranged in the order of head, head-neck, neck, chest, chest-abdomen, pelvis, and leg provided in advance and maximum values of region scores in the tomographic images $SL_n$. Here, an arrangement is made in which a cost is incurred if mismatching occurs between the reference region and maximum value of the region scores $sc_{np}$ in each of tomographic images $SL_n$, and a final decision on the regions $P_n$ is made by obtaining a path having a lowest cost and shortest length. More specifically, a method for solving an optimization problem may be used. In the present embodiment, a dynamic programming method (DP matching) will be described as one of the specific examples.

First, with respect to region scores $sc_{np}$ shown in FIG. 5A, region scores in each slice are subtracted from the maximum value in the slice. This yields a weight map shown in FIG. 5B in which magnitude relation of the region scores $sc_{np}$ is reversed, that is, each of the region scores $sc_{np}$ is converted to a value greater than or equal to zero, and the region score having a highest score is converted to zero. Here, when generating the weight map, conversion using a reference table may be used instead of the subtraction method described above.

Next, with the weigh map shown in FIG. 5B as input, a path having a lowest cost and path length is calculated by the DP matching. Here, the description of a method made by the applicant of the present invention in Japanese Unexamined Patent Publication No. 2006-140041 will be cited. First, with the weigh map shown in FIG. 5B as input, a cost map shown in FIG. 4C is generated. In FIG. 5C, the cost of each cell (n, p) is set in the following manner. Here, n indicates the slice number, and p is the number representing a region (1: head-neck, 2: neck, 3: chest).

(1, 1): value at (1, 1) in the weight map (FIG. 5B)
(n, 1): value at (n−1, 1) in the weight map+predetermined value (0, here)
(1, m): value at (1, m−1) in the weight map+predetermined value (0, here)
(n, m): minimum value among (i) to (iii) shown below.
(i) value at (n−1, m−1) in the cost map+value at (n, m) in the weight map
(ii) value at (n, m−1) in the cost map+value at (n, m) in the weight map+predetermined value (1.0 here)
(iii) value at (n−1, m) in the cost map+value at (n, m) in the weight map+predetermined value (1.0 here)

Next, minimum values are sequentially traced on the cost map from right to left. This yields a correspondence map between the slice number and region.

Figure 6:
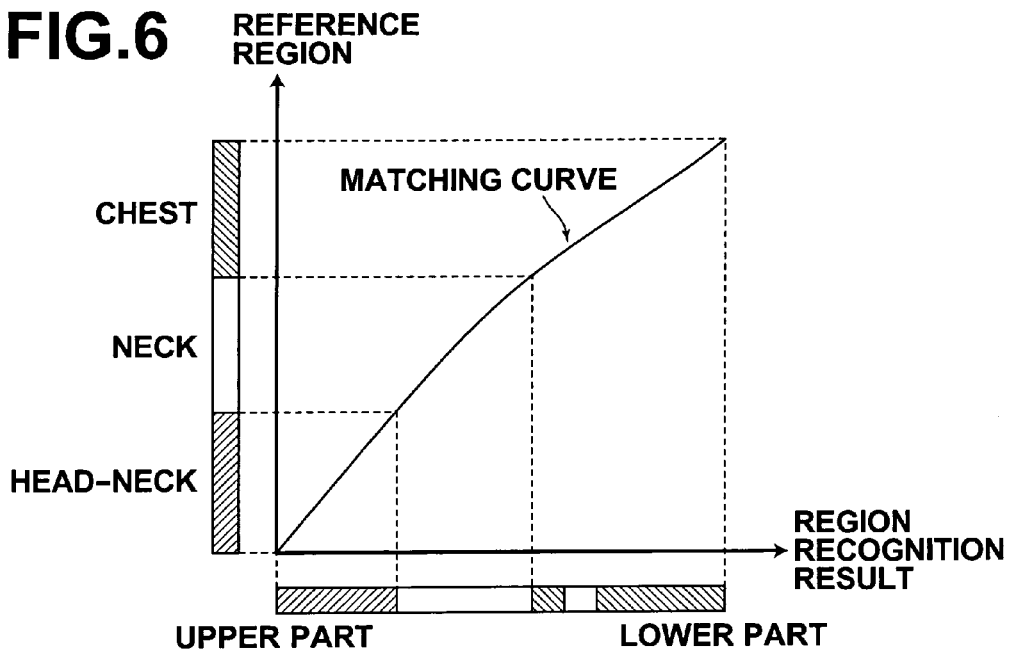
FIG. 6 illustrates an example of matching curve used in region recognition processing.

This results in that the processing for making a final decision on the region of each of the slices $SL_n$ is completed, in which a provisional recognition result based on the maximum value of the region scores $sc_{np}$ in each of the slices $SL_n$ is replaced by the corresponding reference region based on the matching curve with the arrangement order of human body portions (reference regions) as the vertical axis and the provisional recognition result as the horizontal axis illustrated in FIG. 6.

The recognition result display control unit 22 is a processing unit implemented in the region recognition result correction terminal 5. It causes each of the tomographic images and a recognition result $(SL_n, P_n)$ thereof, and a result after correction of the recognition result $(SL_n, P_n')$ to be described later to be displayed on the display unit 31. Here, the display unit 31 is a display of the region recognition result correction terminal 5. FIG. 5 illustrates an example of region recognition result screen displaying a recognition result $(SL_n, P_n)$. As illustrated, the region recognition result screen 50 includes an area 51 where each of the tomographic images $SL_n$ is displayed, an area 52 where the recognition result $P_n$ of the region represented by each of the images is displayed, a slice switching button 53 for switching display of the tomographic images $SL_n$ (previous slice switching button 53a, next slice switching button 53b), an area 55 where a coronal section image CP through obtained by reconstructing a plurality of tomographic images $SL_n$ using a MPR method is displayed, a color bar 56 for displaying a region recognition result $P_n$ in different color at each position of the cross-sectional image CP in the perpendicular direction, that is, at each of slice positions of the tomographic images $SL_n$, and a legend 57 for explaining a region of each region in the color bar 56. In this screen, the user may individually confirm each of the tomographic images $SL_n$ (area 51) and recognition result $P_n$ (area 52) of the region represented by the image. In addition, the user may globally confirm recognition results of the regions at the respective positions in the perpendicular direction of the plurality of tomographic images $SL_n$ by the coronal section image CP (area 55) and color bar 56. The user may cause the display of each of the tomographic images $SL_n$ to be switched by depressing (clicking) the slice switching button 53 using the mouse or the like of the region recognition result correction terminal 5. The switching of the tomographic images $SL_n$ may also be performed automatically at a predetermined interval. The reconstructed image displayed on the area 55 may be a cross-sectional image by sagittal portioning.

Figure 7:
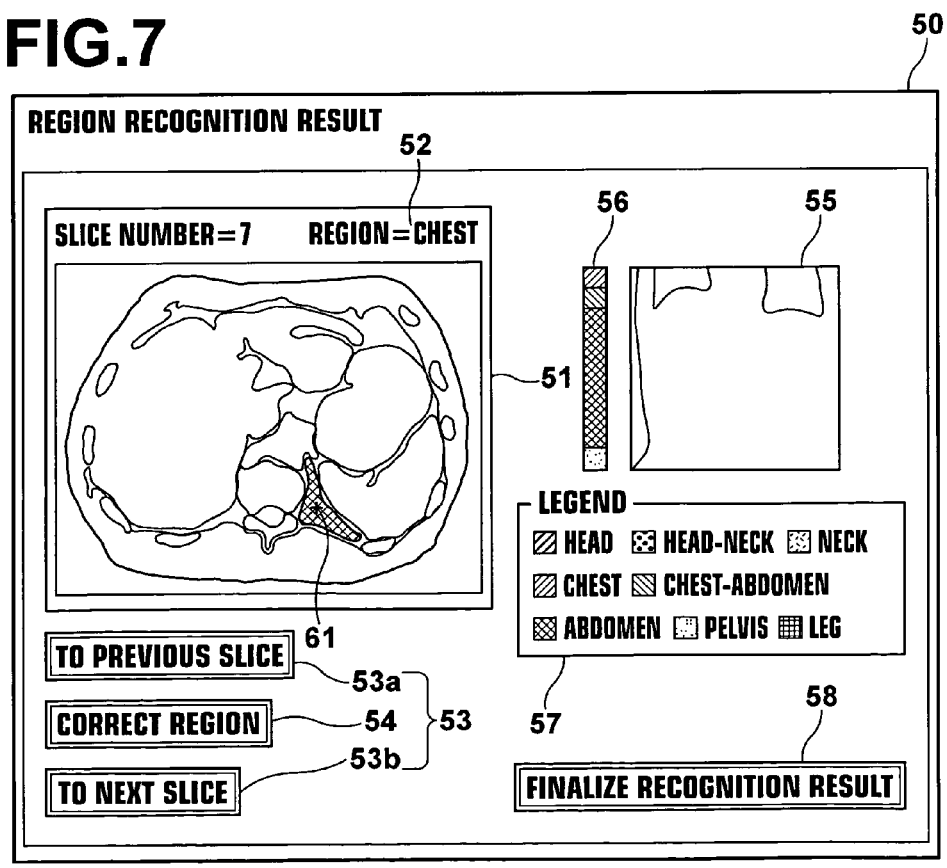
FIG. 7 illustrates an example of region recognition result screen in the first embodiment of the present invention.

The correction information accepting unit 23 is a processing unit implemented in the region recognition result correction terminal 5 and functions as a user interface for accepting input of correction information MI for correcting results of region recognition. In the present embodiment, the correction information accepting unit 23 accepts a position which is supposed to be a boundary of different regions as the correction information MI. The region correction button 54 on the region recognition result display screen 50 shown in FIG. 7 is an example of this user interface. For example, the user confirms displayed contents while switching the tomographic images $SL_n$ (area 51) and region recognition results $P_n$ thereof (area 52), identifies a position which is supposed to be a boundary of different regions, and depresses the region correction button 54 at the timing when the first tomographic image after the position is displayed. The correction information accepting unit 23 detects the depressing event of the region correction button 54, and accepts the position between the tomographic image $(SL_J)$ displayed when the event is detected and the tomographic image $SL_{J−1}$ displayed before that as the correction information MI representing the position which is supposed to be a boundary of different regions. The specifying operation for the position of the boundary by the user described above may be performed by double clicking on the tomographic image displayed in the area 51 or the like instead of depressing operation of the region correction button 54.

Figure 8B:
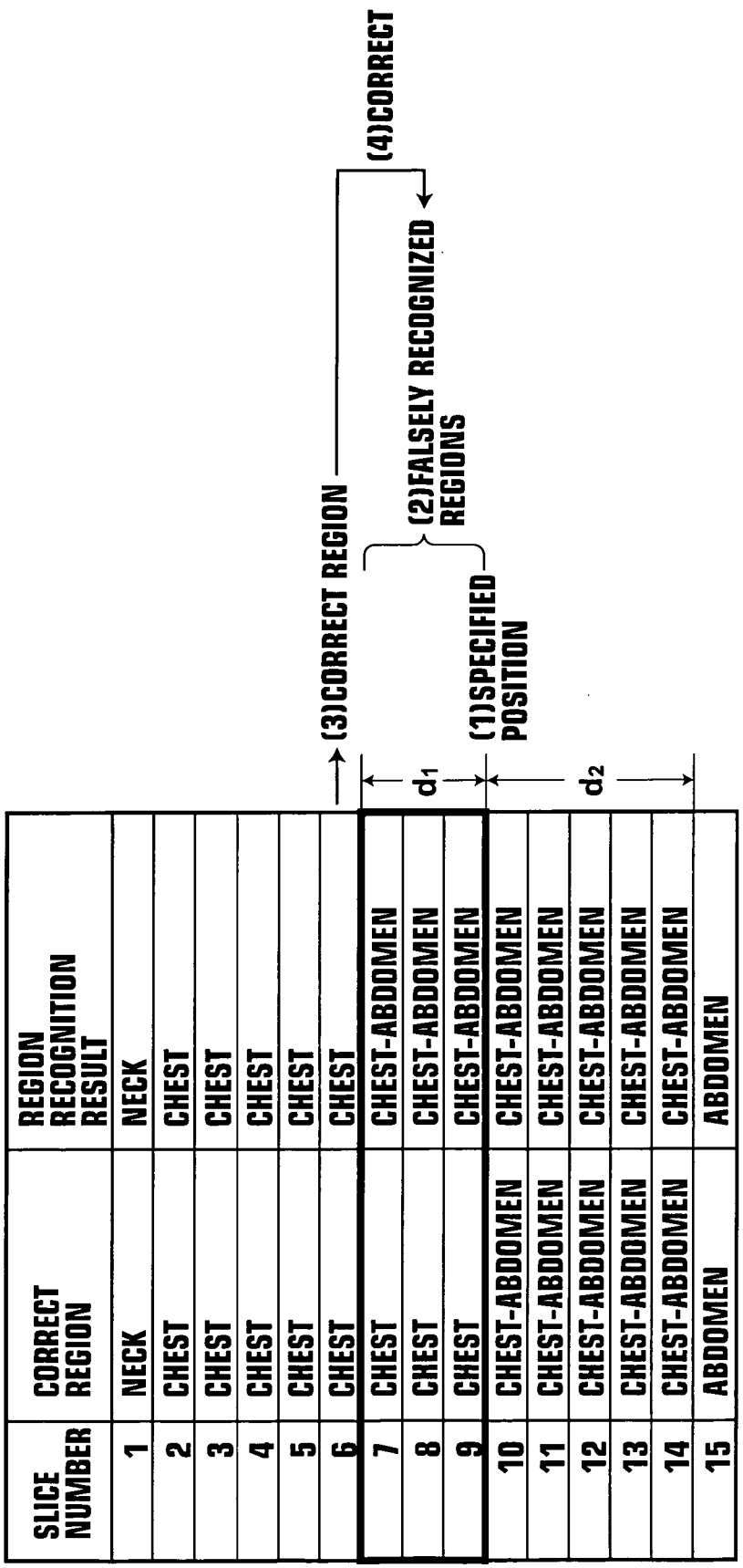
FIG. 8B illustrates another example of region recognition result correction processing in the first embodiment of the present invention.

FIGS. 8A and 8B illustrate specific examples of input acceptance of the correction information MI, in which correct regions (determined by the user) and recognition results made by the region recognition unit 21 with respect to 15 tomographic images (slices) $SL_1$ to $SL_{15}$ are shown. In the example shown in FIG. 8A, while performing a confirmation operation of the recognition results made by the region recognition unit 21 from a slice adjacent to slices 6 or 7 recognized as the boundary of different regions, for example, from slice 5, the user founds that slice 7 is recognized as chest as in the example screen shown in FIG. 7, but it is a recognition error and should be chest-abdomen because various organs of abdomen are observed as a whole although a lung region (61) is observed, then determines that between slices 7 and 8 is the boundary between the chest and chest-abdomen, and depresses the region correction button 54 at the timing when slice 7 is displayed. This causes the correction information accepting unit 23 to accept the position between slice 7 and preceding slice 6 as the position which is supposed to be a boundary of different regions, that is, as the correction information MI. In the mean time, in the example shown in FIG. 8B, while performing a confirmation operation of the recognition results made by the region recognition unit 21 from slice 5 in the same manner as described above, the user determines that the recognition result of chest-abdomen for slice 7 is an error and should be chest, but determines that the boundary between chest and chest-abdomen lies ahead because the recognition result for slice 6 is also chest. Then, continuing the confirmation operation for the recognition results, and when slice 10 is confirmed to be correctly recognized as chest-abdomen, the user determines that between slices 9 and 10 is the boundary between chest and chest-abdomen, and depresses the region correction button 54 at the timing when slice 10 is displayed. This causes the correction information accepting unit 23 to accept the position between slice 10 and preceding slice 9 as the position which is supposed to be a boundary of different regions, that is, as the correction information MI. It is noted that the correction information accepting unit 23 can not recognize that the boundary position included in the correction information MI is between which regions at this point of time.

In the examples described above, the correction information accepting unit 23 determines that the boundary between different regions lies between a slice displayed when the region correction button 54 is depressed and the preceding slice. But an arrangement may be adopted in which the boundary between different regions lies between a slice displayed when the region correction button 54 is depressed and the following slice, and the user depresses the region correction button 54 at the timing when slice 6 is displayed in FIG. 8A, or at the timing when slice 9 is displayed in FIG. 8B. Further, another arrangement may be adopted in which a user interface is provided for selecting either the preceding or following slice of the slice displayed when the region correction button 54 is depressed is used to define the boundary of different regions, and the correction information accepting unit 23 determines the boundary position according to the selection.

Still further, an arrangement may be adopted in which each of the positions of the cross-sectional image CP displayed on the area 55 of the region recognition result display screen 50 is stored in association with the corresponding tomographic image $SL_n$, and the user specifies the position which is supposed to be a boundary of different regions in the cross-sectional image CP by double clicking thereon or the like, and the specified boundary position is accepted as the correction information MI.

Figure 9:
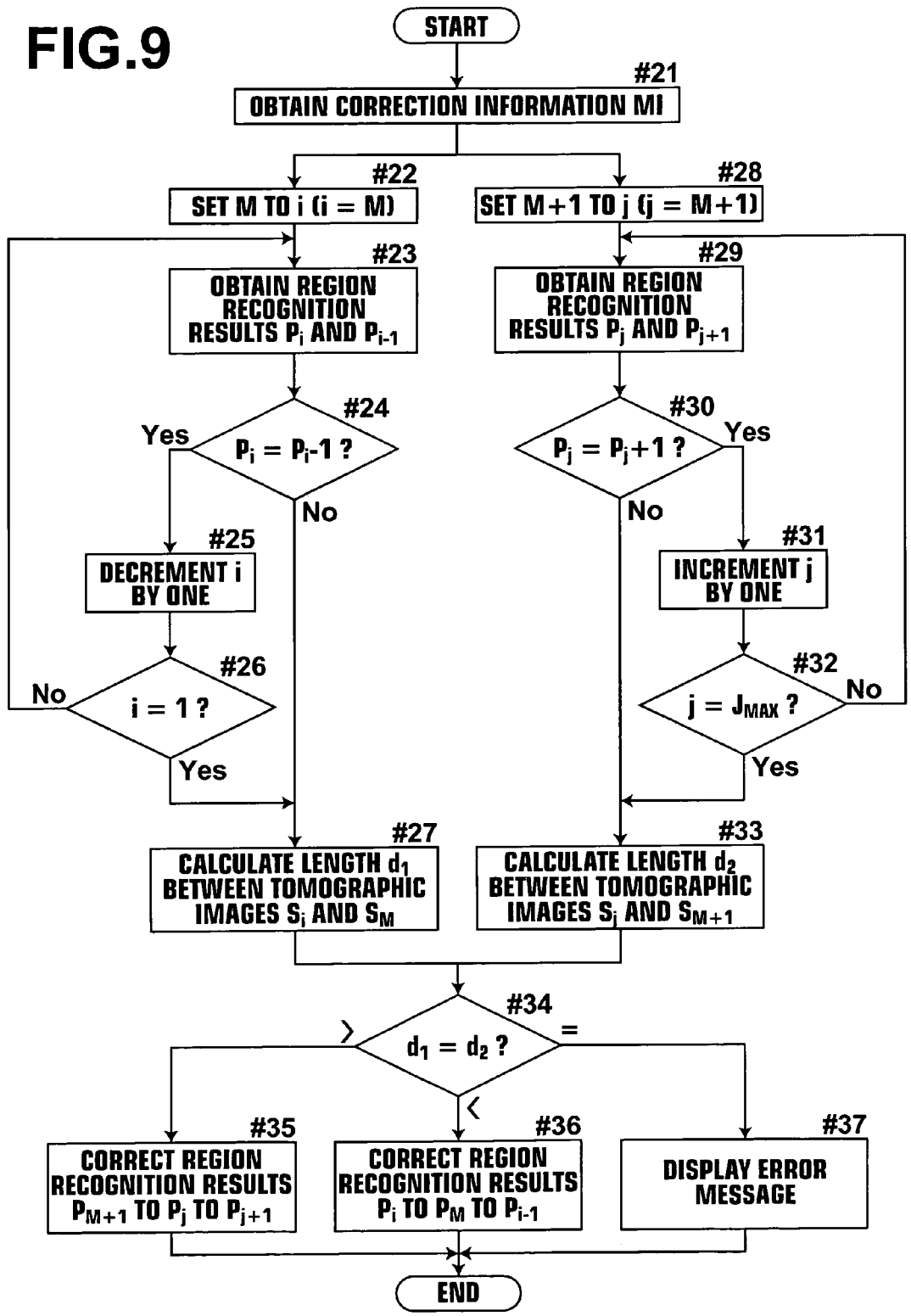
FIG. 9 is a flowchart illustrating a flow of the region recognition result correction processing in the first embodiment of the present invention.

The region correction unit 24 is a processing unit implemented in the region recognition result correction terminal 5 and performs correction processing on the recognition results based on the position which is supposed to be a boundary of different regions accepted as the correction information MI and recognition results of tomographic images adjacent to the position in the present embodiment. Hereinafter, a flow of the processing will be described in detail with reference to the flowchart of FIG. 9.

First, region correction unit 24 obtains correction information MI (#21). Then, it sets a value M representing the preceding tomographic image of the position to be the boundary described above to a counter i for tomographic image identification (#22), and obtains region recognition results $P_i$ and $P_{i-1}$ of tomographic images $SL_i$ and $SL_{i-1}$ (#23). Here, a comparison is made between the region recognition results $P_i$ and $P_{i-1}$ (#24), and if they correspond with each other (#24: YES), the counter i is decremented by one (#25), and if the value of the counter i does not reach a value of one (#26: NO), acquisition of region recognition results $P_i$ and $P_{i-1}$ of tomographic images $SL_i$ and $SL_{i-1}$ (#23), and comparison between the region recognition results $P_i$ and $P_{i-1}$ (#24) are performed. The processing steps from #23 to #26 are repeated until the region recognition results $P_i$ and $P_{i-1}$ become different from each other (#24: NO) or until the value of the counter i reaches a value of one (leading tomographic image). Thereafter, a length $d_1$ between the tomographic images $SL_i$ and $SL_m$ is obtained (#27). As the length $d_1$, the number of tomographic images between the tomographic images $SL_i$ and $SL_{i-1}$ may be directly used or the total sum of the slice thickness and slice interval recorded in the accessory information of each tomographic image included between the tomographic images $SL_i$ and $SL_m$.

The region correction section 24 performs the following in parallel with processing steps from #22 to #27 or in tandem. That is, it sets a value M+1 to another counter j for tomographic image identification (#28), and obtains region recognition results $P_j$ and $P_{j+1}$ of tomographic images $SL_j$ and $SL_{j+1}$ (#29). Here, a comparison is made between the region recognition results $P_j$ and $P_{j+1}$ (#30), and if they correspond with each other (#30: YES), the counter j is incremented by one (#31), and if the value of the counter j does not reach the total number $J_{MAX}$ (representing the last tomographic image) (#32: NO), acquisition of region recognition results $P_j$ and $P_{j+1}$ of tomographic images $SL_j$ and $SL_{j+1}$ (#29), and comparison between the region recognition results $P_j$ and $P_{j+1}$ (#30) are performed. The processing steps from #29 to #32 are repeated until the region recognition results $P_j$ and $P_{j+1}$ become different from each other (#30: NO) or until the value of the counter j reaches $J_{MAX}$. Thereafter, a distance $d_2$ between the tomographic images $SL_j$ and $SL_{m+1}$ is obtained (#33).

Through the processing steps described above, the region correction unit 24 detects a position of the boundary of different regions in the region recognition results on both sides of the position (correction position) which is supposed to be a boundary of different regions obtained as the correction information MI, and lengths $d_1$ and $d_2$ between each of the detected boundary positions and the correction position.

The region correction unit 24 further makes a comparison between the length $d_1$ between the tomographic image $SL_i$ and $SL_m$ and the length $d_2$ between the $SL_j$ and $SL_{M+1}$ (#34), and if the length $d_1$ is longer (#34: $d_1 > d_2$), corrects the region recognition results $P_{M+1}$ to $P_j$ from the tomographic images $SL_{M+1}$ to $SL_j$ to the region correction result $P_{j+1}$ of the tomographic image $SL_{j+1}$ (#35). If the length $d_2$ is longer (#34: $d_1 < d_2$), the region correction unit 24 corrects the region recognition results $P_i$ to $P_M$ from the tomographic images $SL_i$ to $SL_M$ to the region correction result $P_{i-1}$ of the tomographic image $SL_{i-1}$ (#36). This results in that a tomographic image lying between a shorter one of the detected boundary positions and the correction position is determined as an incorrectly recognized tomographic image, and a recognition result correction is performed with the region recognition result of a tomographic image which is not the incorrectly recognized tomographic image of those adjoining to the shorter boundary position as the correct recognition result. It is noted that when the lengths $d_1$ and $d_2$ are equal (#34: $d_1 = d_2$), an error message notifying that a region correction can not performed by this method is outputted to the display unit 31 (#37).

In the example shown in FIG. 8A, when i=2 and j=9 with M=6 in the description above, each of the boundary positions between different regions is detected, and corresponds to a case where $d_1 > d_2$. Here, slices 7 to 9 are determined as incorrectly determined tomographic images, and a correction is made according to the user intention with the recognition result of slice 10 as the correct recognition result. In the mean time, in the example shown in FIG. 8B, when i=7 and j=14 with M=9 in the description above, each of the boundary positions between different regions is detected, and corresponds to a case where $d_1 < d_2$. Here, slices 7 to 9 are determined as incorrectly determined tomographic images, and a correction is made according to the user intention with the recognition result of slice 6 as the correct recognition result.

The database registration unit 32 is a processing unit implemented in the image information management server 3 and registers each of a plurality of tomographic images in the image information database 4 with the corresponding final region recognition result attached thereto. When registered, the tomographic image may be divided into each region.

Figure 10:
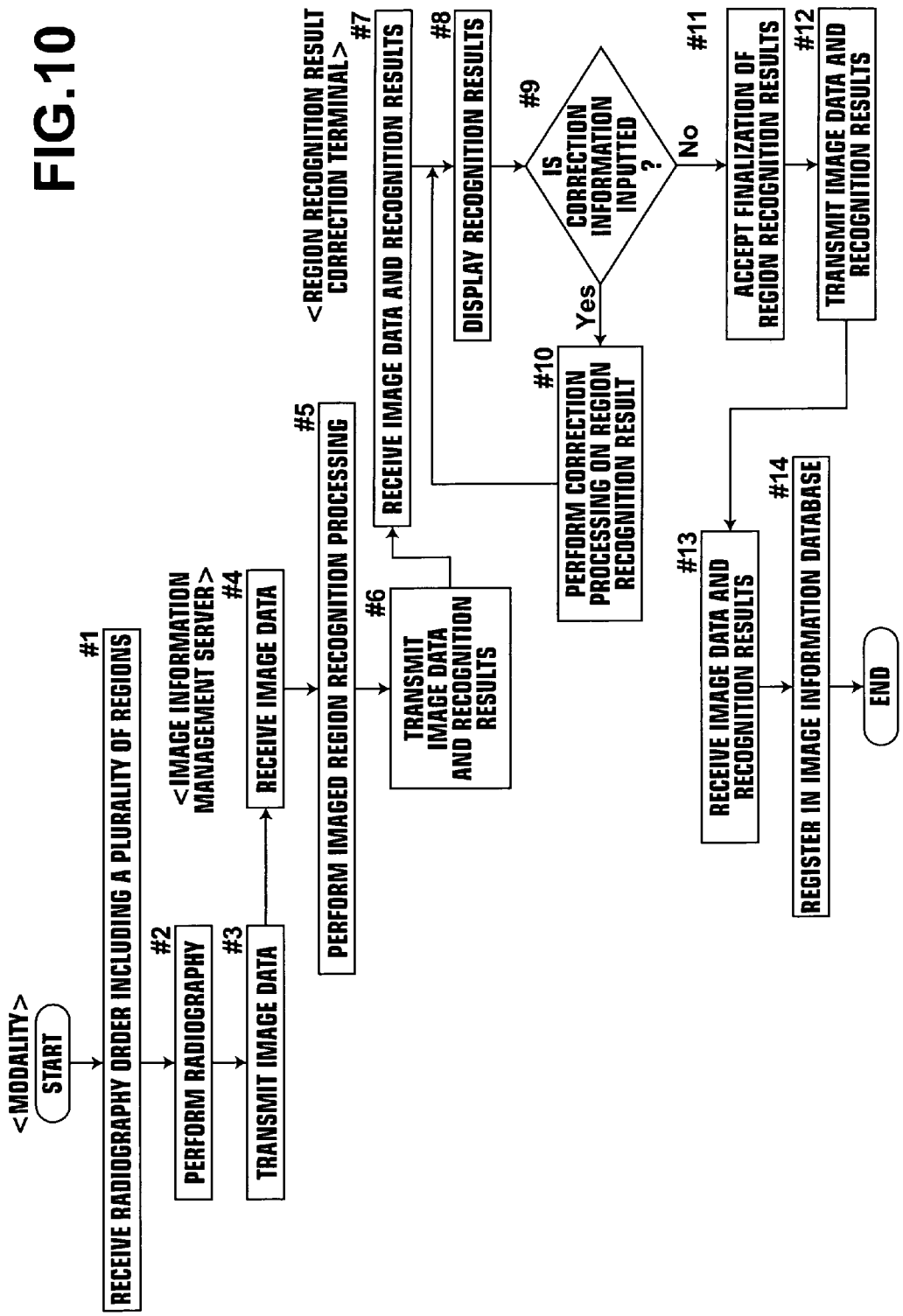
FIG. 10 is a flowchart illustrating an example of workflow including the region recognition result correction processing in any of first to third embodiments of the present invention.

Next, a workflow of the region recognition result correction processing with reference to the flowchart of FIG. 10, the block of FIG. 2, and the like.

First, an imaging order including a plurality of imaging regions is received in an imaging room where the modality 1 is installed (#1), and imaging of the subject is performed based on the imaging order using the modality 1 to obtain a plurality of tomographic images $SL_n$ (n=1, 2, - - - ) (#2). Then, image data of the plurality of tomographic images $SL_n$ are transmitted to the image information management server 3

(#3). The imaging order may be a consolidated order of two or more orders of a single region.

Next, the image information management server 3 receives the image data of the plurality of tomographic images $SL_n$ transmitted from the modality 1 (#4), and the region recognition unit 21 performs the processing for recognizing a region represented by each of the plurality of tomographic images $SL_n$ and records the recognition results $P_n$ as accessory information of the corresponding tomographic image $SL_n$ (#5). The image information management server 3 transmits the data ($SL_n$, $P_n$) of each of the plurality of tomographic images $SL_n$ with the recognition result $P_n$ attached thereto to the region recognition result correction terminal 5 (#6).

The region recognition result correction terminal 5 receives the data ($SL_n$, $P_n$) from the image information management server 3 (#7), and the recognition result display control unit 22 causes the display unit 31 to sequentially display the plurality of tomographic images $SL_n$ with the recognition results $P_n$ related thereto according to an depressing operation of the slice switching button 53 as the region recognition result display screen 50 in FIG. 7 or according to a predetermined time interval. At the same time, it causes the display unit 31 to display a sagittal section image CP which is reconstructed from the plurality of tomographic images $SL_n$ through and the color bar 56 in which the recognition results $P_n$ are associated with the cross-sectional image CP (#8).

The user confirms the recognition results $P_n$ of the tomographic images $SL_n$, in particular, those adjacent to a position recognized as the boundary of different regions, and when the region correction button 54 is depressed by the user at the timing when the tomographic image following the correction position which is supposed to be a boundary of different regions is displayed, the correction information accepting unit 23 accepts the correction position as correction information MI (#9: YES). The region correction unit 24 determines an incorrectly recognized tomographic image and a correct recognition result thereof based on the correction position accepted as the correction information MI and region recognition results of tomographic images adjacent to the correction position as described above, and corrects the recognition result of the incorrectly recognized tomographic image to the correct recognition result (#10). The recognition result display control unit 22 causes the display unit 31 to display the region recognition result screen 50 in which the corrected contents are reflected (#8). The correction instruction by the user as required (#9: YES) and the correction processing by the region correction unit 24 are further performed, and when the user confirms the recognition result of the final tomographic image, determines that no more correction is required (#9: YES), and depresses the recognition result finalization button 58, the region recognition result correction terminal 5 records the corrected recognition result $P_n$' as the accessory information of the corresponding tomographic image $SL_n$ (#11), and transmits the data ($SL_n$, $P_n$') of a plurality of tomographic images $SL_n$ with the corrected recognition results $P_n$' recorded therein to the image information management server 3 (#12). Where the correction is not required at all (#9: NO), the processing routine from step 9 (YES) to steps #10 and #8 is not performed.

The image information management server 3 receives the data ($SL_n$, $P_n$') from the region recognition result correction terminal 5, and the database registration unit 32 registers the data ($SL_n$, $P_n$') in the image information database 4 (#14).

In this way, in the medical information system employing the region recognition result correction apparatus according to the first embodiment, the recognition result display control unit 22 causes the display unit to display a plurality of tomographic images $SL_n$ and a sagittal section image CP reconstructed from the tomographic images through, and recognition results of regions of a subject represented by the respective tomographic images $SL_n$ whose positional relationship between the tomographic images matches with anatomical positional relationship of a plurality of regions of the subject. The correction information input accepting unit 23 accepts correction information MI representing a position which is supposed to be a boundary of different regions. The region correction unit 24 determines an incorrectly recognized tomographic image whose result of the recognition processing is incorrect and a correction recognition result representing a correct region in the incorrectly recognized tomographic image based on the correction information MI and the recognition results of tomographic images adjacent to the correction position included in the correction information MI, corrects the recognition result of the incorrectly recognized region to the correct recognition result. Accordingly, users such as radiologists or image diagnosticians who perform correction of region recognition results only need to specify the correction position. They do not have to individually correct tomographic images including incorrect recognition results, so that simple and minimum input operation allows the correction of region recognition results and the burden on the part of users is alleviated in terms of time and effort.

Here, the region correction unit 24 detects positions of the boundaries of different regions obtained by the recognition processing on both sides of the correction position which is supposed to be a boundary of different regions, determines a tomographic image lying between one of the detected boundary positions which is closer to the correction position and the correction position as an incorrectly recognized tomographic image and recognition result of a tomographic image which is not the incorrectly recognized tomographic image of those adjacent to the boundary position closer to the correction position as the correct recognition result.

This processing is based on the assumption that the position of the boundary closer to the correction position is incorrect. If the position of the boundary remote from the correction position is incorrect, the result of the correction processing is incorrect. In actual results of region recognition, however, more tomographic images are recognized correctly and in most cases, only a several tomographic images adjacent to the boundary of different regions are incorrect. Therefore, it is highly unlikely that the correction processing based on the assumption described above gives rise to a problem.

In the embodiment described above, the correction information input accepting unit 23 accepts a position of the boundary of different regions as correction information MI. But, an arrangement may be adopted, for example, in which the user depresses the region correction button 54 at the timing when a tomographic image whose result of the region recognition processing is incorrect is displayed, and the information representing the displayed tomographic image is accepted as the correction information MI. In the example shown in FIG. 8A, information representing slice 7 is the correction information MI, and in the example shown in FIG. 8B, information representing slice 9 is the correction information MI. In this case, the region recognition result correction terminal 5 cannot recognize on which side, before or after, of the tomographic image the position of the boundary is located. But, by replacing M+1 with M in step #28, and $P_{M+1}$ with $P_M$ in step #35 in the flowchart of FIG. 9, it is possible to correct recognition results by the processing identical to that described above. Further, another arrangement may be adopted in which the user depresses the region correction button 54 at the timing when a tomographic image with a correct recognition result is displayed (slice 6 in the example of FIG. 8A, and slice 10 in the example of FIG. 8B), and information representing the displayed tomographic image is accepted as the correction information MI. In this case also, the region recognition result correction terminal 5 can not recognize on which side, before or after, of the tomographic image the position of the boundary is located. But, by replacing M with M−1 in step #22, and $P_M$ with $P_{M-1}$ in step #36 in the flowchart of FIG. 9, it is possible to correct recognition results by the processing identical to that described above.

Next, second and third embodiments of the region recognition result correction processing of the present invention will be described focusing on difference from the first embodiment. These embodiments only differ from the first embodiment in the correction information input accepting unit 23 and region correction unit 24.

In the region recognition result correction apparatus according to the second embodiment, tomographic images adjoining to the correction position which is supposed to be a boundary of different regions and the correct region of the tomographic image are accepted as correction information, and recognition results are corrected based on result of recognition processing on the tomographic images adjacent to the correction position.

Figure 11:
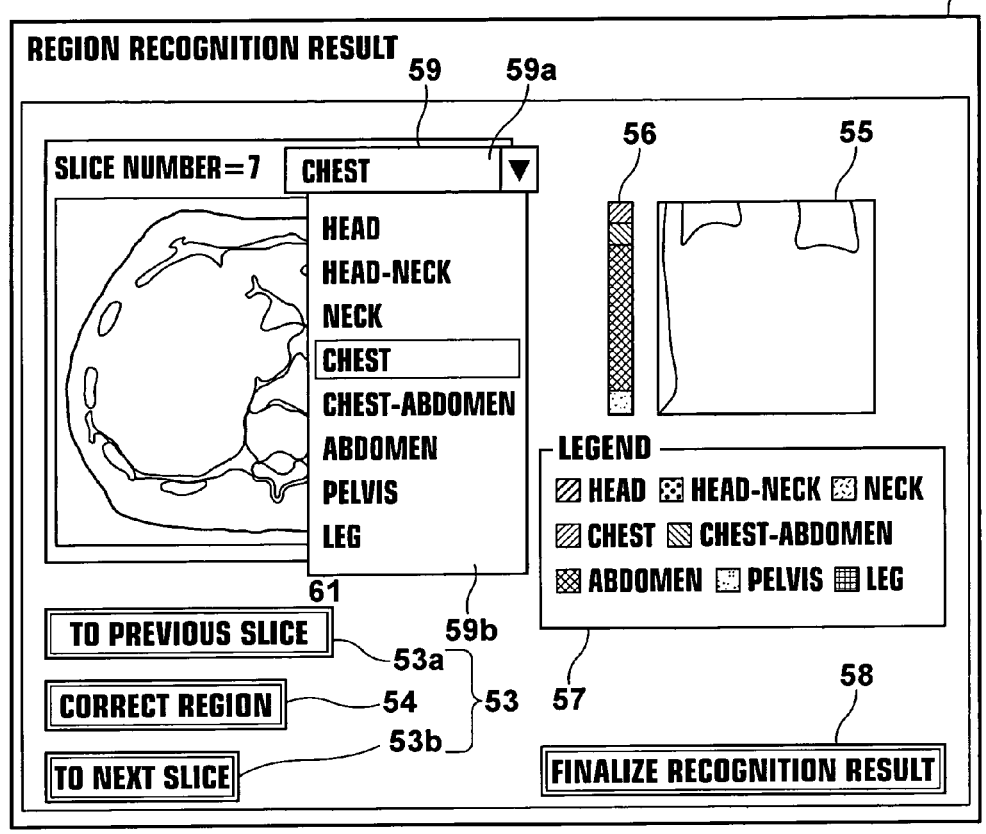
FIG. 11 illustrates an example of region recognition result screen in the second embodiment of the present invention.

FIG. 11 illustrates an example of user interface of the correction information accepting unit 23 according to the present embodiment. As illustrated, the display area 52 of the region recognition result shown in FIG. 7 is replaced with a list box 59. For example, the user confirms region recognition result displayed in the box section 59a of the list box 59 while switching tomographic images $SL_n$ displayed in the region 51 by depressing the slice switching button 53, displays a tomographic image whose result of the region recognition processing is incorrect adjoining to the correction position which is supposed to be a boundary of different regions, and depresses the arrow of the box section 59a of the list box 59. This causes a list section 59b of the list box 59 to be displayed, and the user selects (clicks) a correct region name from region names displayed in the list section 59b. Further, when the user depresses the region correction button 54, the correction information input accepting unit 23 accepts information representing the tomographic image displayed at that time and the region name selected by the user as the correction information MI. It is note that the user interface described above is only for illustration purposes, and other user interfaces may also be used. For example, a user interface in which buttons representing respective regions are displayed on the screen and user selects a correct region name by depressing the button may be employed.

FIG. 12 is a flowchart illustrating a flow of the processing of the region correction unit 24 according to the present invention. First, the region correction unit 24 obtains correction information MI (#41). Then, it sets a value M−1 representing a tomographic image $SL_{M-1}$ preceding the tomographic image ($SL_M$) accepted as the correction information MI to a counter i for tomographic image identification (#42), and obtains a region recognition result $P_i$ of tomographic image $SL_i$ (#43). Here, if the region recognition result $P_i$ does not correspond to the correct region ($P_{MI}$) accepted as the correction information(#44: NO), the counter i is decremented by one (#45), and if the value of the counter i does not reach a value of one (leading tomographic image) (#46: NO), acquisition of region recognition result $P_i$ of tomographic image $SL_i$ (#43), and comparison between the region recognition results $P_i$ and correct region $P_{MI}$ (#44) are performed.

The processing steps from #43 to #46 are repeated until the region recognition results $P_i$ corresponds to the correct region $P_{MI}$ (#44: YES) or until the value of the counter i reaches a value of one (#46: YES). When the region recognition result $P_i$ corresponds to the correct region $P_{MI}$ (#44: YES), the region correction unit 24 determines tomographic images from $SL_{i+1}$ to $SL_M$ as incorrectly recognized tomographic images, and stores information representing each tomographic image in a memory (#47).

The region correction unit 24 performs the following in parallel with processing steps from #42 to #47 or in tandem. That is, it sets a value M+1 representing a tomographic image $SL_{M+1}$ following the tomographic image accepted as the correction information to another counter j for tomographic image identification (#48), and obtains region recognition result $P_j$ of tomographic image $SL_j$ (#49). Here, if the region recognition result $P_j$ does not correspond to the correct region $P_{MI}$ accepted as the correction information(#50: NO), the counter j is incremented by one (#51), and if the value of the counter j does not reach a total value of $J_{MAX}$ (representing the last tomographic image) (#52: NO), acquisition of region recognition result $P_j$ (#49), and comparison between the region recognition results $P_j$ and correct region $P_{MI}$ (#50) are performed. The processing steps from #49 to #52 are repeated until the region recognition results $P_j$ corresponds to the correct region $P_{MI}$ (#50: YES) or until the value of the counter j reaches $J_{MAX}$ (#52: YES). When the region recognition result $P_j$ corresponds to the correct region $P_{MI}$ (#50: YES), the region correction unit 24 determines tomographic images from $SL_M$ to $SL_{j-1}$ as incorrectly recognized tomographic images, and stores information representing each tomographic image in a memory (#53).

Through the processing steps described above, the region correction unit 24 checks region recognition results of tomographic images adjacent to the tomographic image $S_{LM}$ inputted as the correction information MI on both sides of the tomographic image $S_{LM}$ away therefrom to detect a correct tomographic image of a region corresponding to the inputted correct region, and determines tomographic images lying between the correct tomographic image and the tomographic image $S_{LM}$ and the tomographic image $S_{LM}$ as incorrectly recognized tomographic images.

Finally, the region correction unit 24 corrects the region recognition result of an incorrect image determined in step #47 or #53 to the correct region $P_{MI}$ (#54).

Figure 13A:
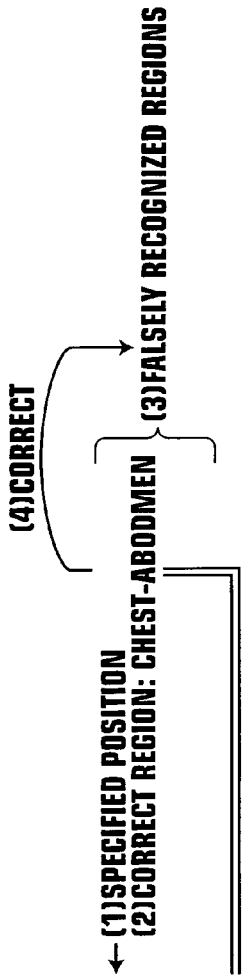
FIG. 13A illustrates an example of region recognition result correction processing in the second embodiment of the present invention.
Figure 13B:
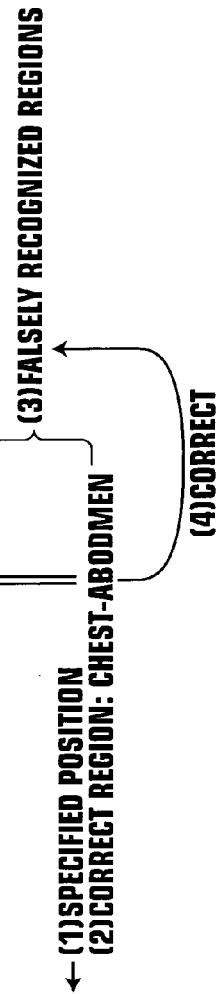
FIG. 13B illustrates another example of region recognition result correction processing in the second embodiment of the present invention.

For example, consider the case of recognition results of tomographic images shown in FIGS. 13A and 13B. In the case of FIG. 13A, the user performs an entry that the correct region recognition result of slice 7 is chest-abdomen. Then, the region correction section 24 determines that the recognition result of slice 10 corresponds to the inputted correct region (chest-abdomen), and corrects recognition results of slices from slice 7 to 9 to the correct region (chest-abdomen). In the case of FIG. 13B, the user performs an entry that the correct region recognition result of slice 9 is chest. Then, the region correction section 24 determines that the recognition result of slice 6 corresponds to the inputted correct region (chest), and corrects recognition results of slices from slice 7 to 9 to the correct region (chest).

As described above, in the region recognition result correction apparatus according to the second embodiment of the present, the correction information input accepting unit 23 accepts input of correction information MI which includes a tomographic image $S_{LM}$ with an incorrect recognition processing result of those adjoining to the correction position which is supposed to be a boundary of different regions and correct region $P_{MI}$ of the tomographic image. The region correction unit 24 detects a correct tomographic image with a result obtained by the recognition processing corresponding to the correct region PMI from tomographic images adjacent to the inputted tomographic image $S_{LM}$, determines that tomographic images lying between the correct tomographic image and the tomographic image $S_{LM}$ and the tomographic image $S_{LM}$ as incorrectly recognized tomographic images, and performs correction with the correct region $P_{MI}$ as the correct recognition result. Accordingly, users only need to specify the tomographic image $S_{LM}$ and the correct region $P_{MI}$ of the tomographic image, and do not have to individually correct tomographic images whose recognition results are incorrect, so that simple and minimum input operation allows the correction of region recognition results and the burden on the part of users is alleviated in terms of time and effort.

Instead of performing the aforementioned processing, the region correction unit 24 may determine the matching of anatomical relationship between each of the region recognition results $P_{M-1}$ and $P_{M+1}$ of the tomographic images $SL_{M-1}$ and $SL_{M+1}$ before and after the inputted tomographic image $SL_M$ and inputted correct region $P_{MI}$, and determine that an incorrectly recognized image presents on the side determined to be mismatched, and correct the recognition result of each of tomographic images to the correct region $P_{MI}$ on the mismatched side in the direction away from the tomographic image $SL_M$ until a tomographic image with a result of the recognition processing corresponding to the correct region $P_{MI}$ is found. For example, the matching determination of anatomical relationship may be performed in the following manner. Obtaining regions that can present before and after the inputted correct region $P_{MI}$ and determining whether or not the region recognition result $P_{M-1}$ corresponds to the region that can be present before the correct region $P_{MI}$ or the region recognition result $P_{M+1}$ corresponds to the region that can be present after the correct region $P_{MI}$ with reference to a table in which the arrangement order of each of the regions is defined.

For example, in the case of FIG. 13A, since the region recognition result of slices 6 and 8 before and after inputted slice 7 is chest and the inputted correct region is chest-abdomen, the region correction unit 24 determines the fact that slice 6 is chest and following slice 7 is chest-abdomen matches with the anatomical positional relationship, but the fact that slice 7 is chest-abdomen and following slice 8 is chest does not match with the anatomical positional relationship, and corrects the recognition results from slice 8 onwards to slice 9 just before slice 10 whose recognition result is chest-abdomen.

The region recognition result correction apparatus according to the third embodiment of the present invention accepts input of correction information representing a range from a tomographic image whose result of the recognition processing is incorrect to a tomographic image whose result of the recognition processing is correct adjacent to the correction position, and corrects the recognition results of incorrectly recognized tomographic images included in the specified range with the recognition result of the lastly specified tomographic image as the correct recognition result.

As shown in FIG. 14, the user interface of the correction information input accepting unit 23 according to the present embodiment has the identical display screen to that shown in FIG. 7. While confirming the sagittal section image CP and the color bar 56 on the region recognition result display screen 50, the user specifies a range on the cross-sectional image CP from the correction position which is supposed to be a boundary of different regions to the correct position of region recognition result, that is, the slice position of the tomographic image having a correct region recognition result for correcting an incorrectly recognized tomographic images including the slice position of an incorrectly recognized tomographic image whose result of the region recognition processing is incorrect (area 62 in FIG. 14) by a mouse drag operation from the region recognition result correction terminal 5. The correction information input accepting unit 23 obtains correction information MI by serially accepting information representing the tomographic images included in the specified range while maintaining the specified order.

Alternatively, while switching tomographic images $SL_n$ displayed in the area 51 by depressing the slice switching button 53, the user confirms the region recognition result displayed in the display area 52, and depresses the region correction button 54 at the timing when a tomographic image ($SL_x$) whose result of the region recognition processing is incorrect adjoining to the correction position which is supposed to be a boundary of different regions. Further, the user depresses the slice switching button 53 as appropriate so that tomographic images whose result of the region recognition processing are incorrect adjacent to the tomographic image $SL_x$ are sequentially displayed, and depresses the region correction button 54 at the timing when each of the tomographic images is displayed. In addition, the user depresses the slice switching button 53, and depresses the region correction button 54 at the timing when the tomographic image with correct region recognition result, that is, the tomographic image representing a region which is the correct region for the tomographic images whose results of the recognition processing are incorrect is displayed. Here, the region correction button 54 may be depressed for a plurality of tomographic images having correct region correction results, but may not include a plurality types of regions. The correction information input accepting unit 23 obtains correction information MI by serially accepting information representing each of the tomographic images specified by the depressing operations of the region correction button while maintaining the specified order.

Figure 15:
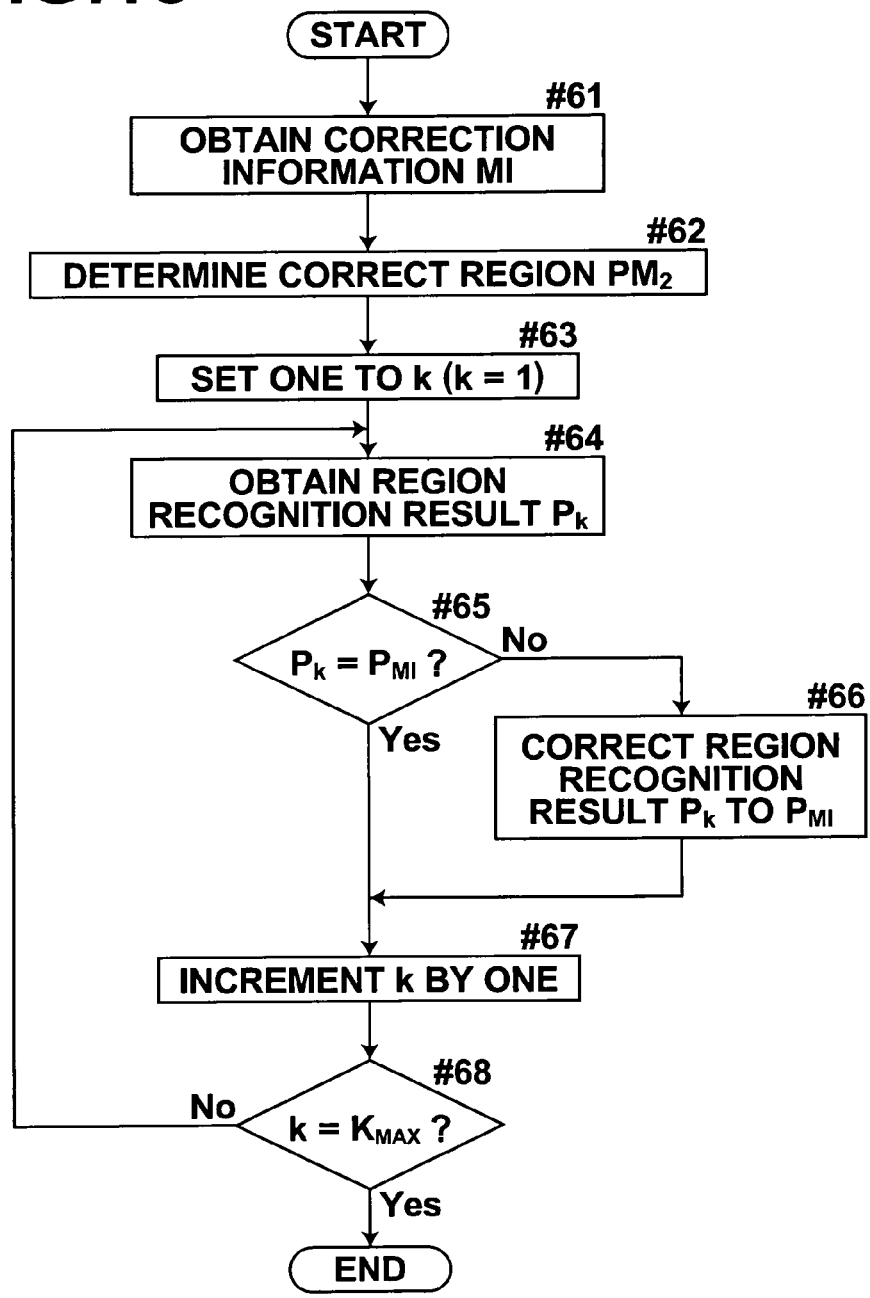
FIG. 15 is a flowchart illustrating a flow of the region recognition result correction processing in the third embodiment of the present invention.

FIG. 15 is a flowchart illustrating a processing flow of the region correction unit 24 according to the present embodiment. First obtains correction information MI (#61) to obtain the tomographic image ($SL_{MI}$) last accepted by the correction information input accepting unit 23, and determines the recognition result ($P_{MI}$) of the tomographic image $SL_{MI}$ as the correct region (#62). Next, it set a value of one to a counter k for identifying a $k^{th}$ tomographic image in the correction information MI (#63), and obtains a region recognition result $P_k$ of the tomographic image $SL_k$ (#64). Here, if the region recognition result $P_k$ and correct region $P_{MI}$ do not correspond to each other (#65: NO), the region recognition result $P_k$ is corrected to $P_{MI}$ (#66). If the region recognition result $P_k$ corresponds to the correct region $P_{MI}$ (#65: YES), no processing is performed. Then, the value of the counter k is incremented by one (#67), and if the value of the counter k does not reach $K_{MAX}$ (corresponds to the second to the lastly accepted tomographic image) (#68: NO), acquisition of region recognition result $P_k$ (#64) and comparison between the region recognition result $P_k$ and the correct region $P_{MI}$ (#65), and correction of the region recognition result $P_k$ when not corresponding to the correct region $P_{MI}$ are performed. The processing steps from #64 to #68 are repeated until the value of the counter k reaches the $K_{MAX}$. Through the processing steps described above, a tomographic image $SL_{MI}$ having a correct result of the recognition processing is identified from the correction information MI, and tomographic images having a different result of the correction processing from the correct recognition result $P_{MI}$ included in the correction information MI are determined as incorrectly recognized tomographic images and corrected with the region recognized in the tomographic image $SL_{MI}$ as the correct recognition result $P_{MI}$.

Figure 16A:
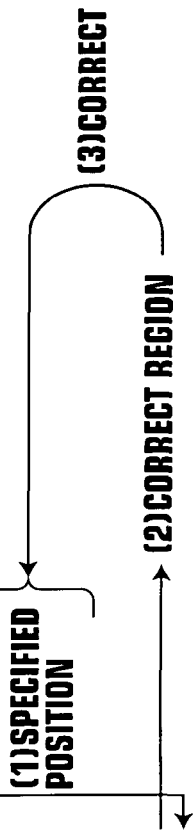
FIG. 16A illustrates an example of region recognition result correction processing in the third embodiment of the present invention.

For example, consider the case of recognition results of tomographic images shown in FIGS. 16A and 16B. In the case of FIG. 16A, for example, the user performs entries for serially specifying slices from 7 to 11 (the lastly specified slice may be any one of the slices from 10 to 14). Then, the region correction unit 24 determines that the region recognition result of lastly specified slice 11 is a correct region (chest-abdomen), and corrects recognition results of slices 7 to 9 out of slices 7 to 10 having different recognition results from the correct region to the correct region (chest-abdomen). In the case of FIG. 16B, for example, the user performs entries for serially specifying slices from 9 to 5 (the lastly specified slice may be any one of the slices from 2 to 6). Then, the region correction unit 24 determines that the region recognition result of lastly specified slice 5 is a correct region (chest), and corrects recognition results of slices 9 to 7 out of slices 9 to 6 having different recognition results from the correct region to the correct region(chest).

As described above, in the region recognition result correction apparatus according to the third embodiment of the present invention, the correction information input accepting unit 23 accepts input of correction information MI representing a range including a tomographic image whose result of the recognition processing is incorrect adjoining to the correction position which is supposed to be a boundary of different regions to a tomographic image $SL_{MI}$ having a correct result of the recognition processing. The region correction unit 24 identifies the tomographic image $SL_{MI}$ having a correct result of the recognition processing from the correction information MI, and tomographic images having a different result of the correction processing from the correct recognition result $P_{MI}$ included in the correction information MI are determined as incorrectly recognized tomographic images and corrected with the region recognized in the tomographic image $SL_{MI}$ as the correct recognition result $P_{MI}$. Accordingly, users only need to specify a range including an incorrectly recognized tomographic image and a correctly recognized tomographic image in a predetermined order, and do not have to individually correct tomographic images including incorrect recognition results, so that simple and minimum input operation allows the correction of region recognition results and the burden on the part of users is alleviated in terms of time and effort.

In the embodiment described above, a determination is made in step #65 as to whether or not each of tomographic images included in the correction information MI corresponds to the correct region $P_{MI}$, and if not correspond, the correction is made in step #66. The same correction results may be obtained without performing such determination and instead correcting all of the tomographic images included in the correction information MI. In this case, it is conceivable that the correction information MI is constructed to have a stack data region, and sets of information representing tomographic images are outputted on a last-in, first-out basis. If that is the case, the region correction unit 25 may determine the recognition result of the leading tomographic image ($SL_{MI}$) as the correct region $P_{MI}$, and then serially read out the remaining sets of information representing the tomographic images and correct the recognition result of each of the tomographic images.

Various other region recognition result correction methods may be conceivable. For example, as illustrated in FIGS. 17A and 17B, the correction information input accepting unit 23 may accept all of the slices having incorrect recognition results selected by the user, slices 7 to 9, as the correction information MI, and the region correction unit 24 may correct recognition results of incorrectly recognized slices 7 to 9 with one of the two slices, slices 6 and 10, adjacent to the specified incorrectly recognized slices 7 to 9 having a recognition result (chest-abdomen in FIG. 17A, chest in FIG. 17B) which is different from the result of recognition processing of the incorrectly recognized slices (chest in FIG. 17A, chest-abdomen in FIG. 17B) as the correct recognition result.

Figure 18:
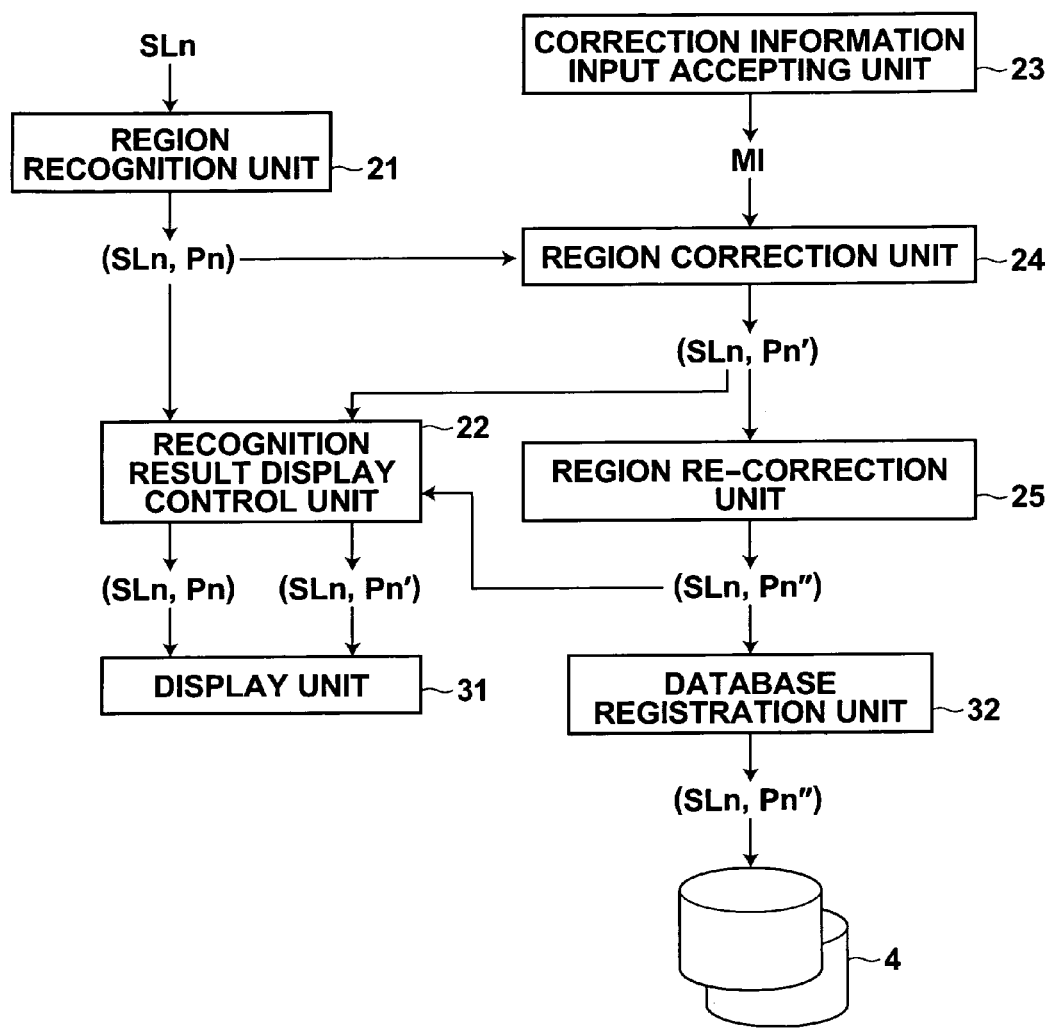
FIG. 18 is a block diagram illustrating a region recognition result correction apparatus according to a fourth embodiment of the present invention, illustrating the configuration thereof including periphery.

The region recognition result correction apparatus according to a fourth embodiment of the present invention further includes a function to further correct the region recognition result after corrected by the region correction unit 24 based on a determination from the viewpoint of anatomical validity. FIG. 18 is a block diagram schematically illustrating a configuration and data flow for realizing the function described above. As illustrated, the apparatus of the present invention has a configuration including the configuration illustrated in FIG. 2 with an additional region re-correction unit 25. The processing units other than the region re-correction unit 25 maybe those of any of the embodiments described above.

The region re-correction unit 25 is a processing unit implemented in the region recognition result correction terminal 5. In the present embodiment, the unit determines on an inputted region recognition result whether or not the length of each region in the direction perpendicular to the tomographic plane of the tomographic image is within a range of anatomically possible length and, if not, performs re-correction on the recognition result of the region.

In the case of FIG. 8A, for example, lengths of regions are checked in the directions away from slice 7 specified by the user (direction from slice 7 toward slice 1 and direction from slice 7 toward slice 10) based on corrected recognition results, and correct a region if it has an extraordinary length. For example, if chest-abdomen has a longer length that the possible range described above by the correction of the region correction unit 24, a region following the slice having a length exceeding the possible range is corrected to abdomen.

The range of anatomically possible length may be obtained by referring to a reference table or the like. The region length may be obtained by the number of slices×slice thickness, or by a distance calculating method using the slice positions of slices adjacent to the boundary of different regions.

As for a workflow of the region recognition result correction apparatus including the region re-correction processing of the present invention, the region re-correction processing may be inserted in step #11 of the flowchart shown in FIG. 10. That is, when the user confirms the recognition result of the final tomographic image, determines that no more correction is required (#9: YES), and depresses the recognition result finalization button 58 of FIG. 7, the region re-correction unit 25 performs the re-correction processing. If a re-correction is actually performed, the recognition result display control unit 22 causes the display unit 31 to display the post re-correction recognition results ($SL_n$, $P_n$"). If a re-correction is not actually performed, the corrected recognition results $P_n$' may be recorded in the corresponding tomographic images $SL_n$.

Alternatively, the region re-correction processing may be inserted in step #10 of the flowchart shown in FIG. 10, and the region re-correction unit 25 performs the re-correction processing after recognition results with respect to incorrectly recognized tomographic images are corrected by the region correction unit 24. Then, the recognition result display control unit 22 causes the display unit 31 to display the region recognition result screen 50 in which the correction and re-correction contents are reflected.

As described above, in the region recognition result correction apparatus according to the fourth embodiment, the region re-correction unit 25 determines with respect to region recognition results by the region recognition unit 21 or by the region correction unit 23 whether or not each of the regions in the direction perpendicular to the tomographic plane of the tomographic image is within a range of anatomically possible length and, if a region having a length which is anatomically impossible is present, the recognition result of the region is re-corrected, so that the accuracy of the region recognition results further improved.

In particular, in the first embodiment of the present invention, the region correction unit 24 performs the processing on the assumption that one of the positions of the boundaries of different regions detected on both sides of the correction position which is closer to the correction position is incorrect, so that if a tomographic image that does not satisfy the assumption should present, incorrect processing might be performed. But, addition of the region re-correction unit 25 to the first embodiment allows the incorrect processing performed by the region correction unit 24 to be corrected, so that it is useful.

It should be appreciated that various changes and modifications made to the system configurations, processing flows, user interfaces, and the like in the embodiments described above without departing from the scope of the invention are all included in the technical scope of the present invention. The embodiments described above are for illustration purposes only, and should not in anyway be construed as limiting the technical scope of the present invention.

In particular, with respect to the processing of the correction information input accepting unit 23 and region correction unit 24, other method than those illustrated in the embodiment may be used as long as correction information MI includes information that can identify a correction position which is supposed to be a boundary of different regions, and the method determines an incorrectly recognized tomographic image and a correct region thereof and performs correction thereon based on at least either one of an anatomical positional relationship of a subject or a result of recognition processing performed on a tomographic image adjacent to the correction position, and the correction information MI.

As for the system configuration, the region recognition unit 21 may be implemented in the region recognition result correction terminal 5 instead of implementing in the image information management server 3. Further, instead of using the region recognition result correction terminal 5, a configuration may be adopted in which a quality management workstation (QA-WS) used for performing normalization processing (EDR processing) and quality control processing on an image received from the modality 1, allowing medical technologists to perform image quality inspection, and the like is connected to the network 19, the region recognition result correction apparatus is implemented in the quality management workstation, image information after the region recognition results are finalized is transmitted to the image information management server 3, and the image information is registered in the image information database 4 by the image information management server 3.

What is claimed is:

1. A region recognition result correction apparatus, comprising:
   a recognition means for receiving input of a plurality of tomographic images, each of which represents a cross section perpendicular to an axis of a human body at a plurality of different positions along the axis of the human body, recognizing a single anatomical portion from among a plurality of different regions which are arranged along a direction of the axis of the human body within each of the tomographic images, and for recognizing the anatomical portions represented in each of the tomographic images such that the order in which the anatomical portions recognized within the plurality of tomographic images are arranged matches the order of anatomical portions of the plurality of different anatomical portions along the direction of the axis of the human body, which is prepared in advance, when the anatomical portions recognized within the plurality of tomographic images are arranged in the order that the corresponding tomographic images are arranged;
   a recognition result display control means, for displaying each of the plurality of tomographic images on a screen with the anatomical portion recognized therein by the recognition means;
   input receiving means, for receiving input that specifies a correction position, which is a position between two adjacent tomographic images, with respect to the display on the screen by the recognition result display control means; and
   an anatomical portion correcting means, for detecting boundary positions, at which the anatomical portions recognized by the recognition means differ between two adjacent tomographic images, in both the upper and lower directions along the axis of the human body from the correction position, determining a plurality of tomographic images, which are positioned between a boundary position which is closer to the correction position from among the boundary positions detected in the upper and lower directions and the correction position as erroneously recognized tomographic images, and for correcting the anatomical portions recognized by the recognition means within the erroneously recognized tomographic images to the anatomical portion recognized by the recognition means within the tomographic image which is not determined to be erroneously recognized tomographic images, from between the two tomographic images which are positioned to sandwich the closer boundary position therebetween.

2. A region recognition result correcting apparatus as defined in claim 1, further comprising:
   an anatomical portion re-correction means, for re-correcting the anatomical portion which is recognized in each of at least a portion of tomographic images from among the plurality of tomographic images such that the lengths of each of the recognized plurality of different anatomical portions in the direction of the axis of the human body satisfy predetermined standards, in the case that the lengths of each of the recognized plurality of different anatomical portions, which are calculated employing information regarding each the anatomical portions are recognized within each of the plurality of tomographic images after correction by the anatomical portion correcting means and the lengths of each of the plurality of tomographic images in the direction along the axis of the body, do not satisfy the predetermined standards.

3. A region recognition result correction apparatus as defined in claim 1, wherein:
   the regions represented by the plurality of tomographic images include two or more of a head, a neck, a chest, an abdomen, a pelvis, legs, and combined regions that include two adjacent regions from among the regions listed above.

4. A region recognition result correction apparatus, comprising:
- a recognition means for receiving input of a plurality of tomographic images, each of which represents a cross section perpendicular to an axis of a human body at a plurality of different positions along the axis of the human body, recognizing a single anatomical portion from among a plurality of different regions which are arranged along a direction of the axis of the human body within each of the tomographic images, and for recognizing the anatomical portions represented in each of the tomographic images such that the order in which the anatomical portions recognized within the plurality of tomographic images are arranged matches the order of anatomical portions of the plurality of different anatomical portions along the direction of the axis of the human body, which is prepared in advance, when the anatomical portions recognized within the plurality of tomographic images are arranged in the order that the corresponding tomographic images are arranged;
- a recognition result display control means, for displaying each of the plurality of tomographic images on a screen with the anatomical portion recognized therein by the recognition means;
- input receiving means, for receiving input that specifies a correction position, which is a position between two adjacent tomographic images, one of two tomographic images that sandwich the correction position in which the recognition result by the recognition means is erroneous, and the anatomical portion which is represented within the one of the two tomographic images, with respect to the display on the screen by the recognition result display control means; and
- an anatomical portion correcting means, for detecting a tomographic image in which the anatomical portion recognized by the recognition means is the same as the specified anatomical portion in both the upper and lower directions along the axis of the human body from the correction position, determining a plurality of tomographic images, which are positioned between the detected tomographic image and the specified tomographic image, and the specified tomographic image as erroneously recognized tomographic images, and for correcting the anatomical portions recognized by the recognition means within the erroneously recognized tomographic images to the specified anatomical portion.

5. A region recognition result correction apparatus, comprising:
- a recognition means for receiving input of a plurality of tomographic images, each of which represents a cross section perpendicular to an axis of a human body at a plurality of different positions along the axis of the human body, recognizing a single anatomical portion from among a plurality of different regions which are arranged along a direction of the axis of the human body within each of the tomographic images, and for recognizing the anatomical portions represented in each of the tomographic images such that the order in which the anatomical portions recognized within the plurality of tomographic images are arranged matches the order of anatomical portions of the plurality of different anatomical portions along the direction of the axis of the human body, which is prepared in advance, when the anatomical portions recognized within the plurality of tomographic images are arranged in the order that the corresponding tomographic images are arranged;
- a recognition result display control means, for displaying each of the plurality of tomographic images on a screen with the anatomical portion recognized therein by the recognition means;
- input receiving means, for receiving input that sequentially specifies a plurality of tomographic images along the axis of the human body in one of the upward direction and the downward direction from an arbitrarily selected tomographic image from among the plurality of tomographic images; and
- an anatomical portion correcting means, for determining tomographic images from among the sequentially specified plurality of tomographic images in which the anatomical portion recognized by the recognition means differs from the anatomical portion recognized by the recognition means within the tomographic image which is specified last from among the sequentially specified plurality of tomographic images as erroneously recognized tomographic images, and for correcting the anatomical portions recognized by the recognition means within the erroneously recognized tomographic images to the anatomical portion recognized by the recognition means within the tomographic image which is specified last.

6. A method of recognition result correction, comprising:
- receiving input of a plurality of tomographic images, each of which represents a cross section perpendicular to an axis of a human body at a plurality of different positions along the axis of the human body, recognizing a single anatomical portion from among a plurality of different regions which are arranged along the direction of the axis of the human body within each of the tomographic images, and for recognizing the anatomical portions represented in each of the tomographic images such that the order in which the anatomical portions recognized within the plurality of tomographic images are arranged matches the order of anatomical portions of the plurality of different anatomical portions along the direction of the axis of the human body, which is prepared in advance, when the anatomical portions recognized within the plurality of tomographic images are arranged in the order that the corresponding tomographic images are arranged;
- displaying each of the plurality of tomographic images on a screen with the anatomical portion recognized therein;
- receiving input that specifies a correction position, which is a position between two adjacent tomographic images, with respect to the display on the screen; and
- detecting boundary positions, at which the anatomical portions recognized differ between two adjacent tomographic images, in both upper and lower directions along the axis of the human body from the correction position, determining a plurality of tomographic images, which are positioned between a boundary position which is closer to the correction position from among the boundary positions detected in the upper and lower directions and the correction position as erroneously recognized tomographic images, and for correcting the anatomical portions recognized within the erroneously recognized tomographic images to the anatomical portion recognized within the tomographic image which is not determined to be erroneously recognized tomographic images, from between the two tomographic images which are positioned to sandwich the closer boundary position therebetween.

7. A non-transitory computer readable medium having a program that causes a computer to function as a region recognition result correction apparatus, comprising the steps of:

receiving input of a plurality of tomographic images, each of which represents a cross section perpendicular to an axis of a human body at a plurality of different positions along the axis of the human body, recognizing a single anatomical portion from among a plurality of different regions which are arranged along a direction of the axis of the human body within each of the tomographic images, and for recognizing the anatomical portions represented in each of the tomographic images such that the order in which the anatomical portions recognized within the plurality of tomographic images are arranged matches the order of anatomical portions of the plurality of different anatomical portions along the direction of the axis of the human body, which is prepared in advance, when the anatomical portions recognized within the plurality of tomographic images are arranged in the order that the corresponding tomographic images are arranged;

displaying each of the plurality of tomographic images on a screen with the anatomical portion recognized therein;

receiving input that specifies a correction position, which is a position between two adjacent tomographic images, with respect to the display on the screen; and detecting boundary positions, at which the anatomical portions recognized differ between two adjacent tomographic images, in both upper and lower directions along the axis of the human body from the correction position, determining a plurality of tomographic images, which are positioned between a boundary position which is closer to the correction position from among the boundary positions detected in the upper and lower directions and the correction position as erroneously recognized tomographic images, and for correcting the anatomical portions recognized within the erroneously recognized tomographic images to the anatomical portion recognized within the tomographic image which is not determined to be erroneously recognized tomographic images, from between the two tomographic images which are positioned to sandwich the closer boundary position therebetween.

* * * * *